(12) United States Patent
Ryu et al.

(10) Patent No.: US 12,125,498 B2
(45) Date of Patent: Oct. 22, 2024

(54) ELECTRONIC DEVICE SUPPORTING IMPROVED VOICE ACTIVITY DETECTION

(71) Applicant: SAMSUNG ELECTRONICS CO., LTD., Suwon-si (KR)

(72) Inventors: Seungbeom Ryu, Suwon-si (KR); Sungjae Park, Suwon-si (KR); Hyuk Oh, Suwon-si (KR); Myeungyong Choi, Suwon-si (KR); Junkwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 386 days.

(21) Appl. No.: 17/570,557

(22) Filed: Jan. 7, 2022

(65) Prior Publication Data
US 2022/0254369 A1    Aug. 11, 2022

Related U.S. Application Data

(63) Continuation of application No. PCT/KR2021/019047, filed on Dec. 15, 2021.

(30) Foreign Application Priority Data

Feb. 10, 2021  (KR) ................ 10-2021-0019490

(51) Int. Cl.
| | |
|---|---|
| *G10L 15/00* | (2013.01) |
| *G06N 3/045* | (2023.01) |
| *G10L 15/02* | (2006.01) |
| *G10L 15/16* | (2006.01) |
| *G10L 15/22* | (2006.01) |

(Continued)

(52) U.S. Cl.
CPC .............. *G10L 25/84* (2013.01); *G06N 3/045* (2023.01); *G10L 15/02* (2013.01); *G10L 15/16* (2013.01);

(Continued)

(58) Field of Classification Search
CPC ......... G10L 15/07; G10L 15/20; G10L 15/22; G10L 15/30; G10L 15/26; G10L 15/02;
(Continued)

(56) References Cited

U.S. PATENT DOCUMENTS 8,606,572 B2  12/2013  Zhu et al.
8,831,686 B2   9/2014  Hansson et al.
(Continued)

FOREIGN PATENT DOCUMENTS

CN     112002307      11/2020
KR  10-2010-0115033   10/2010
(Continued)

OTHER PUBLICATIONS

Search Report and Written Opinion issued Apr. 20, 2022 in counterpart International Patent Application No. PCT/KR2021/019047.

*Primary Examiner* — Vu B Hang
(74) *Attorney, Agent, or Firm* — NIXON & VANDERHYE P.C.

(57) ABSTRACT

According to various embodiments, an electronic device may include: a microphone; an audio connector; a wireless communication circuit; a processor operatively connected to the microphone, the audio connector, and the wireless communication circuit; and a memory operatively connected to the processor, wherein the memory may store instructions that, when executed, cause the processor to: receive a first audio signal through the microphone, the audio connector, or the wireless communication circuit, extract audio feature information from the first audio signal, and recognize a speech section in a second audio signal, received after the first audio signal through the microphone, the audio connector, or the wireless communication circuit, using the audio feature information.

16 Claims, 13 Drawing Sheets

(51) Int. Cl.
*G10L 25/84* (2013.01)
*H04R 1/08* (2006.01)
*H04R 3/00* (2006.01)

(52) U.S. Cl.
CPC .............. *G10L 15/22* (2013.01); *H04R 1/08* (2013.01); *H04R 3/00* (2013.01); *G10L 2015/223* (2013.01); *H04R 2420/07* (2013.01)

(58) Field of Classification Search
CPC .............. G10L 15/063; G10L 15/1508; G10L 21/0208; G10L 15/14; G10L 15/197; G10L 15/1815; G10L 15/1822; G10L 15/183; G10L 151/93; G10L 15/19; G10L 15/16; G10L 25/27; G10L 25/30; G10L 19/005; G10L 19/00; G10L 15/08; G10L 15/193; G10L 25/78; G10L 25/87; G10L 15/12

See application file for complete search history.

(56) References Cited

U.S. PATENT DOCUMENTS

| | | | |
|---|---|---|---|
| 9,508,340 B2 * | 11/2016 | Parada San Martin | G06F 1/3203 |
| 9,747,900 B2 | 8/2017 | Zurek et al. | |
| 9,811,765 B2 * | 11/2017 | Wang | G06F 18/24143 |
| 10,672,414 B2 * | 6/2020 | Tashev | G10L 25/84 |
| 11,769,491 B1 * | 9/2023 | Bafna | G10L 25/84 704/231 |
| 11,793,453 B2 * | 10/2023 | Su | A61B 5/742 |
| 2010/0268533 A1 | 10/2010 | Park et al. | |
| 2016/0275964 A1 | 9/2016 | Kim et al. | |
| 2017/0076719 A1 | 3/2017 | Lee et al. | |
| 2019/0392859 A1 | 12/2019 | Li | |
| 2020/0013394 A1 | 1/2020 | Jeong et al. | |
| 2020/0194008 A1 | 6/2020 | Lee et al. | |
| 2020/0234717 A1 | 7/2020 | Zhao et al. | |

FOREIGN PATENT DOCUMENTS

| | | |
|---|---|---|
| KR | 10-2010-0115093 | 10/2010 |
| KR | 10-2016-0112793 | 9/2016 |
| KR | 10-2017-0030923 | 3/2017 |
| KR | 10-1804765 | 11/2017 |
| KR | 10-1811524 | 12/2017 |
| KR | 10-2020-0015225 | 2/2020 |
| KR | 10-2020-0073718 | 6/2020 |
| KR | 10-2020-0087889 | 7/2020 |
| KR | 10-2321792 | 10/2021 |

* cited by examiner

ELECTRONIC DEVICE SUPPORTING IMPROVED VOICE ACTIVITY DETECTION

CROSS-REFERENCE TO RELATED APPLICATIONS

This application is a continuation of International Application No. PCT/KR2021/019047 designating the United States, filed on Dec. 15, 2021, in the Korean Intellectual Property Receiving Office and claiming priority to Korean Patent Application No. 10-2021-0019490, filed on Feb. 10, 2021, in the Korean Intellectual Property Office, the disclosures of which are incorporated by reference herein in their entireties.

BACKGROUND

Field

The disclosure relates to a method and a device for providing a user with an artificial intelligence (AI) agent service using voice activity detection (VAD) in a user utterance.

Description of Related Art

An artificial intelligence system is a computer system for implementing humanlike intelligence, which enables machines to autonomously learn and make a judgment and has an improved recognition rate the more the system is used.

Artificial intelligence technology may include a machine learning (deep learning) technology using an algorithm that autonomously classifies/learns features of input data and element technologies for imitating recognition and determination functions of the human brain using the machine learning technology.

For example, the elemental technologies may include at least one of linguistic understanding technology of recognizing human languages/letters, visual understanding technology of recognizing objects like human eyes, inference/prediction technology of determining information and making logical inference and prediction, knowledge expression technology of processing human experience information into knowledge data, and motion control technology of controlling autonomous driving of a vehicle and the movement of a robot.

Linguistic understanding technology may refer to a technology that recognizes and applies/processes human languages/letters and may include natural language processing, machine translation, a dialogue system, questioning and answering, speech recognition/composition, and the like. In one example of language understanding technology, an electronic device may recognize an utterance of a user using an automatic speech recognition (ASR) model generated by training with a machine learning technology, thereby generating text data corresponding to the utterance.

The electronic device may provide the user with an artificial intelligence (AI) agent service that recognizes a section including the user's voice (utterance) in an audio signal, understands the user's intent in the user's utterance within the recognized section, and outputs a response corresponding to the user's intent as a voice.

When a user speaks, ambient noise (e.g., a TV sound, a vacuum cleaner noise, and people's voices) may make it difficult to recognize a speech section of the user.

A response to a user command may be dependent on VAD. For example, when the start and/or the end of a user speech are misrecognized, a response may be delayed to frustrate the user or a response may be too quick to interrupt the user speaking.

SUMMARY

Embodiments of the disclosure provide an electronic device for implementing VAD resistant to ambient noise. Technical aspects to be achieved in the disclosure are not limited to the technical aspects mentioned above, and other technical aspects not mentioned will be clearly understood by those skilled in the art from the following description.

According to various example embodiments, an electronic device may include: a microphone; an audio connector; a wireless communication circuit; a processor operatively connected to the microphone, the audio connector, and the wireless communication circuit; and a memory operatively connected to the processor, wherein the memory may store instructions that, when executed, cause the processor to: receive a first audio signal through the microphone, the audio connector, or the wireless communication circuit, extract audio feature information from the first audio signal, and recognize a speech section in a second audio signal, received after the first audio signal through the microphone, the audio connector, or the wireless communication circuit, using the audio feature information.

According to various example embodiments, a method for operating an electronic device may include: receiving a first audio signal through a microphone, an audio connector, or a wireless communication circuit, extracting audio feature information from the first audio signal, and recognizing a speech section in a second audio signal, received after the first audio signal through the microphone, the audio connector, or the wireless communication circuit, using the audio feature information.

According to various example embodiments, an electronic device can accurately recognize a speech section in a user utterance even though there is ambient noise when a user speaks. In addition, various effects directly or indirectly identified through this document may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
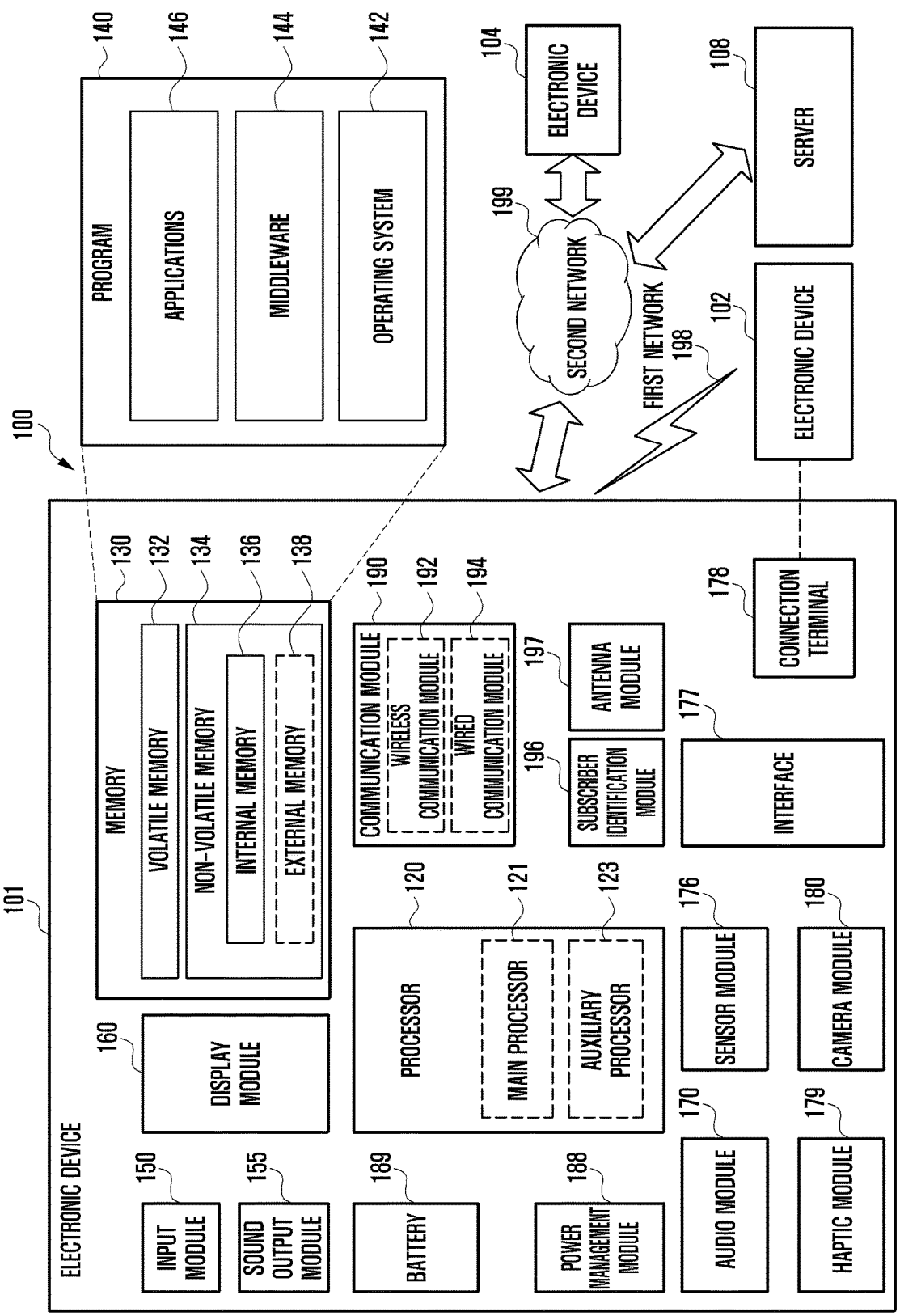
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
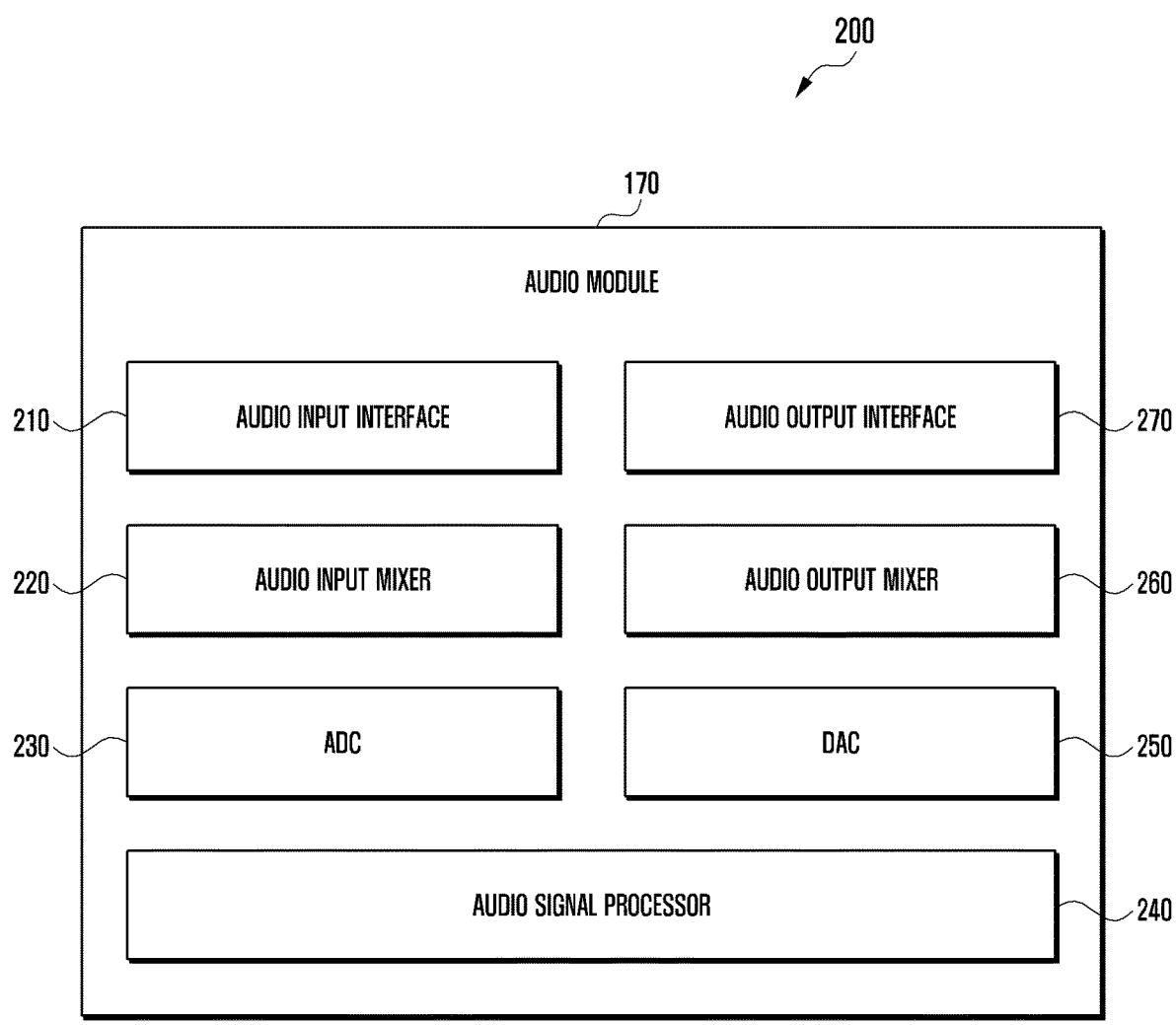
FIG. 2 is a block diagram illustrating an audio module according to various embodiments.

FIG. 2 is a block diagram 200 illustrating an example configuration of the audio module 170 according to various embodiments.

Referring to FIG. 2, the audio module 170 may include, for example, an audio input interface (e.g., including audio input circuitry) 210, an audio input mixer 220, an analog-to-digital converter (ADC) 230, an audio signal processor (e.g., including audio processing circuitry) 240, a digital-to-analog converter (DAC) 250, an audio output mixer 260, and/or an audio output interface (e.g., including audio output circuitry) 270.

The audio input interface 210 may include various audio input circuitry and receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may include various audio processing circuitry and perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may include various audio output circuitry and output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
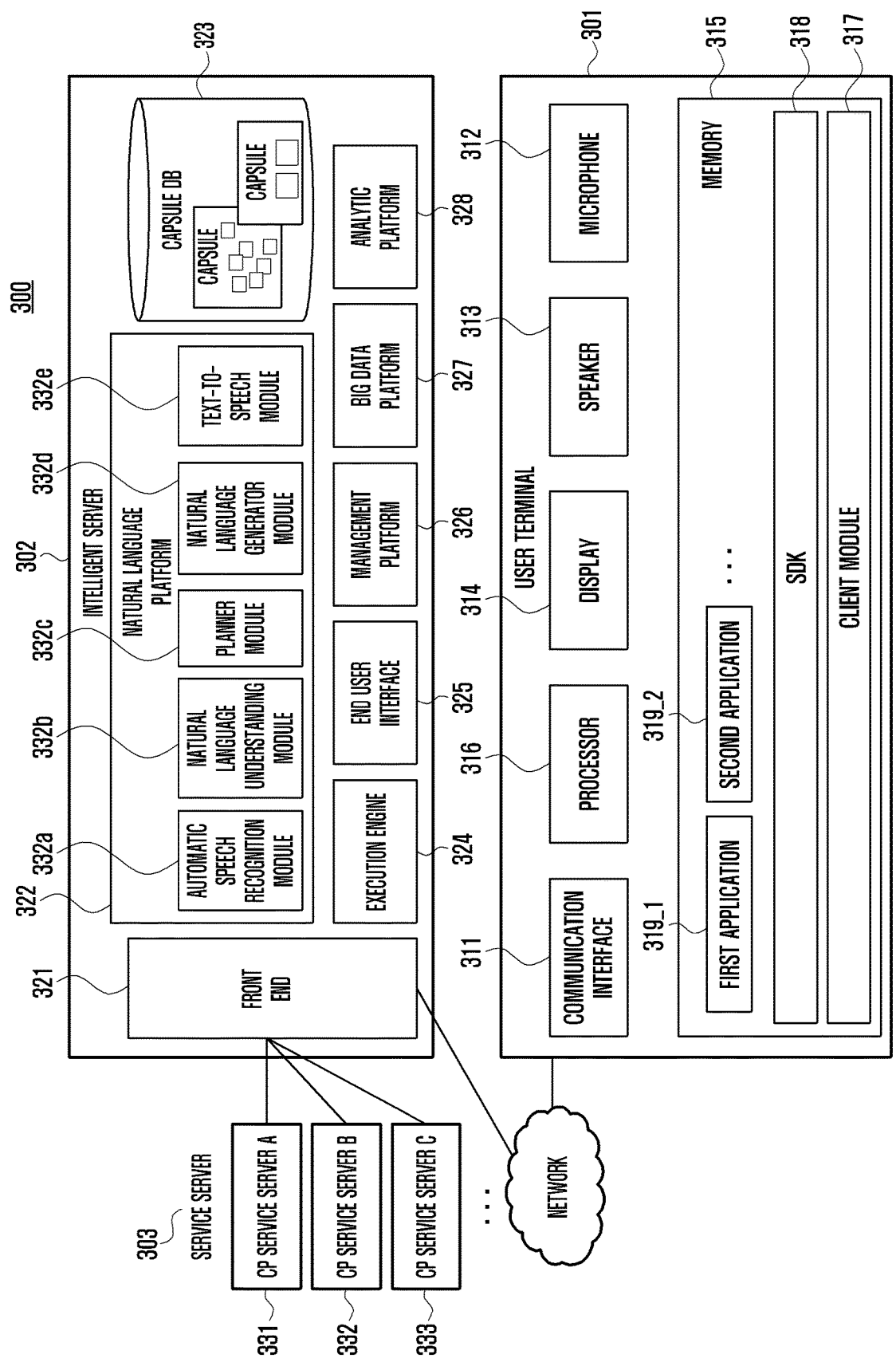
FIG. 3 is a block diagram illustrating an integrated intelligence system according to various embodiments.

FIG. 3 is a block diagram illustrating an example configuration of an integrated intelligence system according to various embodiments.

Referring to FIG. 3, the integrated intelligence system 300 according to an embodiment may include a user terminal 301, an intelligent server 302, and a service server 303.

According to an embodiment, the user terminal 301 may be a terminal device (or electronic device) that can be connected to the Internet, for example, a mobile phone, a smartphone, a personal digital assistant (PDA), a notebook computer, a TV, a domestic appliance, a wearable device, an HMD, or a smart speaker.

According to an embodiment, the user terminal 301 (e.g., the electronic device 101 of FIG. 1) may include a communication interface 311, a microphone 312, a speaker 313, a display 314, a memory 315, and a processor 316. The listed components may be operatively or electrically connected to each other.

According to an embodiment, the communication interface 311 may be configured to be connected to an external device to transmit and receive data. According to an embodiment, the microphone 312 may receive a sound (e.g., a user's utterance) and may convert the sound into an electrical signal. According to an embodiment, the speaker 313 may output an electrical signal as a sound (e.g., a voice). According to an embodiment, the display 314 may be configured to display an image or a video. According to an embodiment, the display 314 may display a graphic user interface (GUI) of an executed application (or application program).

According to an embodiment, the memory 315 may store a client module 317, a software development kit (SDK) 318, and a plurality of applications 319_1 and 319_2. The client module 317 and the SDK 318 may form a framework (or a solution program) for performing a general-purpose function. In addition, the client module 317 or the SDK 318 may form a framework for processing a voice input.

According to an embodiment, the plurality of applications 319_1 and 319_2 in the memory 315 may be programs for performing a designated function. According to an embodiment, the plurality of applications 319_1 and 319_2 may include a first application 319_1 and a second application 319_2. According to an embodiment, each of the plurality of applications 319_1 and 319_2 may include a plurality of operations for performing a designated function. For example, the plurality of applications 319_1 and 319_2 may include at least one of an alarm application, a message application, and a schedule application. According to an embodiment, the plurality of applications 319_1 and 319_2 may be executed by the processor 316 to sequentially execute at least some of the plurality of operations.

According to an embodiment, the processor 316 may control the overall operation of the user terminal 301. For example, the processor 316 may be electrically connected to the communication interface 311, the microphone 312, the speaker 313, the display 314, and the memory 315 to perform a designated operation.

According to an embodiment, the processor 316 may also execute a program stored in the memory 315 to perform a designated function. For example, the processor 316 may execute at least one of the client module 317 or the SDK 318 to perform the following operation for processing a voice input. The processor 316 may control the operation of the plurality of applications 319_1 and 319_2, for example, through the SDK 318. An operation to be described below as the operation of the client module 317 or the SDK 318 may be an operation by execution by the processor 316.

According to an embodiment, the client module 317 may receive a voice input. For example, the client module 317 may generate a voice signal corresponding to a user's utterance detected through the microphone 312. The client module 317 may transmit the received voice input to the intelligent server 302. According to an embodiment, the client module 317 may transmit state information about the user terminal 301, together with the received voice input, to the intelligent server 302. The state information may be, for example, execution state information about an application.

According to an embodiment, the client module 317 may receive a result corresponding to the received voice input. For example, the client module 317 may receive the result corresponding to the received voice input from the intelligent server 302. The client module 317 may display the received result on the display 314.

According to an embodiment, the client module 317 may receive a plan corresponding to the received voice input. The client module 317 may display a result of executing a plurality of operations of an application according to the plan on the display 314. For example, the client module 317 may sequentially display results of executing the plurality of operations on the display. In another example, the user terminal 301 may display only some (e.g., a result of executing the last operation) of the results of executing the plurality of operations on the display.

According to an embodiment, the client module 317 may receive a request for obtaining information required to produce the result corresponding to the voice input from the intelligent server 302. The information required to produce the result may be, for example, state information about an electronic device 300. According to an embodiment, the client module 317 may transmit the required information to the intelligent server 302 in response to the request.

According to an embodiment, the client module 317 may transmit information about the result of executing the plurality of operations according to the plan to the intelligent server 302. The intelligent server 302 may identify that the received voice input has been properly processed using the information about the result.

According to an embodiment, the client module 317 may include a voice recognition module. According to an embodiment, the client module 317 may recognize a voice input for performing a limited function through the voice recognition module. For example, the client module 317 may perform an intelligent application for processing a voice input for performing an organic operation through a designated input (e.g., Wake up!). The client module 317 may recognize a call utterance (e.g., Hi Bixby) in an audio signal received from the microphone 312 and may start an AI agent service in response to the call utterance.

According to an embodiment, the intelligent server 302 (e.g., the server 108 of FIG. 1) may receive information relating to a user voice input from the user terminal 301 through a communication network. According to an embodiment, the intelligent server 302 may change data relating to the received voice input into text data. According to an embodiment, the intelligent server 302 may generate, based on the text data, a plan for performing a task corresponding to the user voice input.

According to an embodiment, the plan may be generated by an artificial intelligence (AI) system. The artificial intelligence system may be a rule-based system or a neural network-based system (e.g., a feedforward neural network (FNN)), or a recurrent neural network (RNN). Alternatively, the artificial intelligence system may be a combination of the above systems or a different artificial intelligence system. According to an embodiment, the plan may be selected from a set of predefined plans, or may be generated in real time in response to a user request. For example, the artificial intelligence system may select at least one plan from among a plurality of predefined plans.

According to an embodiment, the intelligent server 302 may transmit a result obtained according to the generated plan to the user terminal 301 or may transmit the generated plan to the user terminal 301. According to an embodiment, the user terminal 301 may display the result obtained according to the plan on the display 314. According to an embodiment, the user terminal 301 may display a result of executing an operation according to the plan on the display.

According to an embodiment, the intelligent server 302 may include a front end 321, a natural language platform 322, a capsule DB 323, an execution engine 324, an end user interface 325, a management platform 326, a big data platform 327, and an analytic platform 328.

According to an embodiment, the front end 321 may receive a voice input received from the user terminal 301. The front end 321 may transmit a response corresponding to the voice input.

According to an embodiment, the natural language platform 322 may include various modules, each including, for example, various processing circuitry and/or executable program instructions, the modules including an automatic speech recognition module (ASR module) 322a, a natural language understanding module (NLU module) 322b, a planner module 322c, a natural language generator module (NLG module) 322d, and a text-to-speech module (TTS module) 322e.

According to an embodiment, the ASR module 322a may convert a voice input received from the user terminal 301 into text data.

According to an embodiment, the NLU module 322b may understand a user's intent using the text data of the voice input. For example, the NLU module 322b may understand the user's intent by performing a syntactic analysis or a semantic analysis. According to an embodiment, the NLU module 322b may understand the meaning of a word extracted from the voice input using a linguistic feature (e.g., a syntactic element) of a morpheme or phrase and may determine the user's intent by matching the understood meaning of the word to intent.

According to an embodiment, the planner module 322c may generate a plan using the intent determined by the NLU module 322b and a parameter. According to an embodiment, the planner module 322c may determine a plurality of domains necessary to perform a task based on the determined intent. The planner module 322c may determine a plurality of operations respectively included in the plurality of domains determined based on the intent. According to an embodiment, the planner module 322c may determine a parameter required to execute the plurality of determined operations or a result value output by executing the plurality of operations. The parameter and the result value may be defined as a concept related to a designated format (or class). Accordingly, the plan may include the plurality of operations determined by the intent of the user and a plurality of concepts. The planner module 322c may determine a relationship between the plurality of operations and the plurality of concepts by stages (or hierarchically). For example, the planner module 322c may determine the execution order of the plurality of operations, determined based on the user's intent, based on the plurality of concepts. That is, the planner module 322c may determine the execution order of the plurality of operations, based on the parameter required to execute the plurality of operations and the result output by executing the plurality of operations. Accordingly, the planner module 322c may generate a plan including association information (e.g., ontology) between the plurality of operations and the plurality of concepts. The planner module 322c may generate a plan using information stored in a capsule DB 323 in which a set of relationships between concepts and operations is stored.

According to an embodiment, the NLG module 322d may change designated information into a text form. The information changed into the text form may be in the form of a natural language utterance.

According to an embodiment, the TTS module 322e may change information in the text form into information in a voice form.

According to an embodiment, the capsule DB 323 may store information about a relationship between a plurality of concepts and a plurality of operations corresponding to a plurality of domains. For example, the capsule DB 323 may store a plurality of capsules including a plurality of action objects (or pieces of action information) and a plurality of concept objects (or pieces of concept information) of a plan. According to an embodiment, the capsule DB 323 may store the plurality of capsules in the form of a concept action network (CAN). According to an embodiment, the plurality of capsules may be stored in a function registry included in the capsule DB 323.

According to an embodiment, the capsule DB 323 may include a strategy registry that stores strategy information required to determine a plan corresponding to a voice input. The strategy information may include reference information for determining one plan when there is a plurality of plans corresponding to the voice input. According to an embodiment, the capsule DB 323 may include a follow-up registry that stores information about a follow-up for suggesting a follow-up to the user in a specified situation. The follow-up may include, for example, a following utterance. According to an embodiment, the capsule DB 323 may include a layout registry that stores layout information about information output through the user terminal 301. According to an embodiment, the capsule DB 323 may include a vocabulary registry that stores vocabulary information included in capsule information. According to an embodiment, the capsule DB 323 may include a dialog registry that stores information about a dialog (or interaction) with the user.

According to an embodiment, the capsule DB 323 may update a stored object through a developer tool. The developer tool may include, for example, a function editor for updating an action object or a concept object. The developer tool may include a vocabulary editor for updating vocabulary. The developer tool may include a strategy editor for generating and registering a strategy for determining a plan. The developer tool may include a dialog editor that generates a dialog with the user. The developer tool may include a follow-up editor capable of activating a following target and editing a following utterance providing a hint. The following target may be determined based on a currently set target, user preference, or an environmental condition.

According to an embodiment, the capsule DB 323 can also be implemented in the user terminal 301. That is, the user terminal 301 may include the capsule DB 323 that stores information for determining an operation corresponding to a voice input.

According to an embodiment, the execution engine 324 may produce a result using the generated plan. According to an embodiment, the end user interface 325 may transmit the produced result to the user terminal 301. Accordingly, the user terminal 301 may receive the result and may provide the received result to the user. According to an embodiment, the management platform 326 may manage information used in the intelligent server 302. According to an embodiment, the big data platform 327 may collect user data. According to an embodiment, the analytic platform 328 may manage the quality of service (QoS) of the intelligent server 302. For example, the analytic platform 328 may manage a component and the processing speed (or efficiency) of the intelligent server 302.

According to an embodiment, the service server 303 may provide a designated service (e.g., a food delivery service or a hotel reservation service) to the user terminal 301. According to an embodiment, the service server 303 may be a server operated by a third party. For example, the service server 303 may include a first service server (CP service server A) 331, a second service server (CP service server B) 332, and a third service server (CP service server C) 333 that are operated by different third parties. According to an embodiment, the service server 303 may provide information for generating a plan corresponding to a received voice input to the intelligent server 302. The provided information may be stored, for example, in the capsule DB 323. In addition, the service server 303 may provide result information according to the plan to the intelligent server 302.

In the foregoing integrated intelligent system 300, the user terminal 301 may provide various intelligent services to the user in response to a user input. The user input may include, for example, an input through a physical button, a touch input, or a voice input.

In an embodiment, the user terminal 301 may provide a voice recognition service through an intelligent application (or voice recognition application) stored therein. In this case, for example, the user terminal 301 may recognize a user utterance or a voice input received through the microphone and may provide a service corresponding to the recognized voice input to the user.

In an embodiment, the user terminal 301 may perform a designated operation alone or together with the intelligent server 302 and/or the service server 303, based on the received voice input. For example, the user terminal 301 may execute an application corresponding to the received voice input and may perform the designated operation through the executed application.

In an embodiment, when the user terminal 301 provides a service together with the intelligent server 302 and/or the service server 303, the user terminal 301 may detect a user utterance using the microphone 312 and may generate a signal (or voice data) corresponding to the detected user speech. The user terminal 301 may transmit the voice data to the intelligent server 302 using the communication interface 311.

According to an embodiment, the intelligent server 302 may generate, as a response to voice input received from the user terminal 301, a plan for performing a task corresponding to the voice input or a result of performing an operation according to the plan. The plan may include, for example, a plurality of operations for performing the task corresponding to the user's voice input and a plurality of concepts related to the plurality of operations. The concepts may define a parameter input to execute the plurality of operations or a result value output by executing the plurality of operations. The plan may include information about an association between the plurality of operations and the plurality of concepts.

According to an embodiment, the user terminal 301 may receive the response using the communication interface 311. The user terminal 301 may output an audio signal generated inside the user terminal 301 to the outside using the speaker 313 or may output an image generated inside the user terminal 301 to the outside using the display 314.

Figure 4:
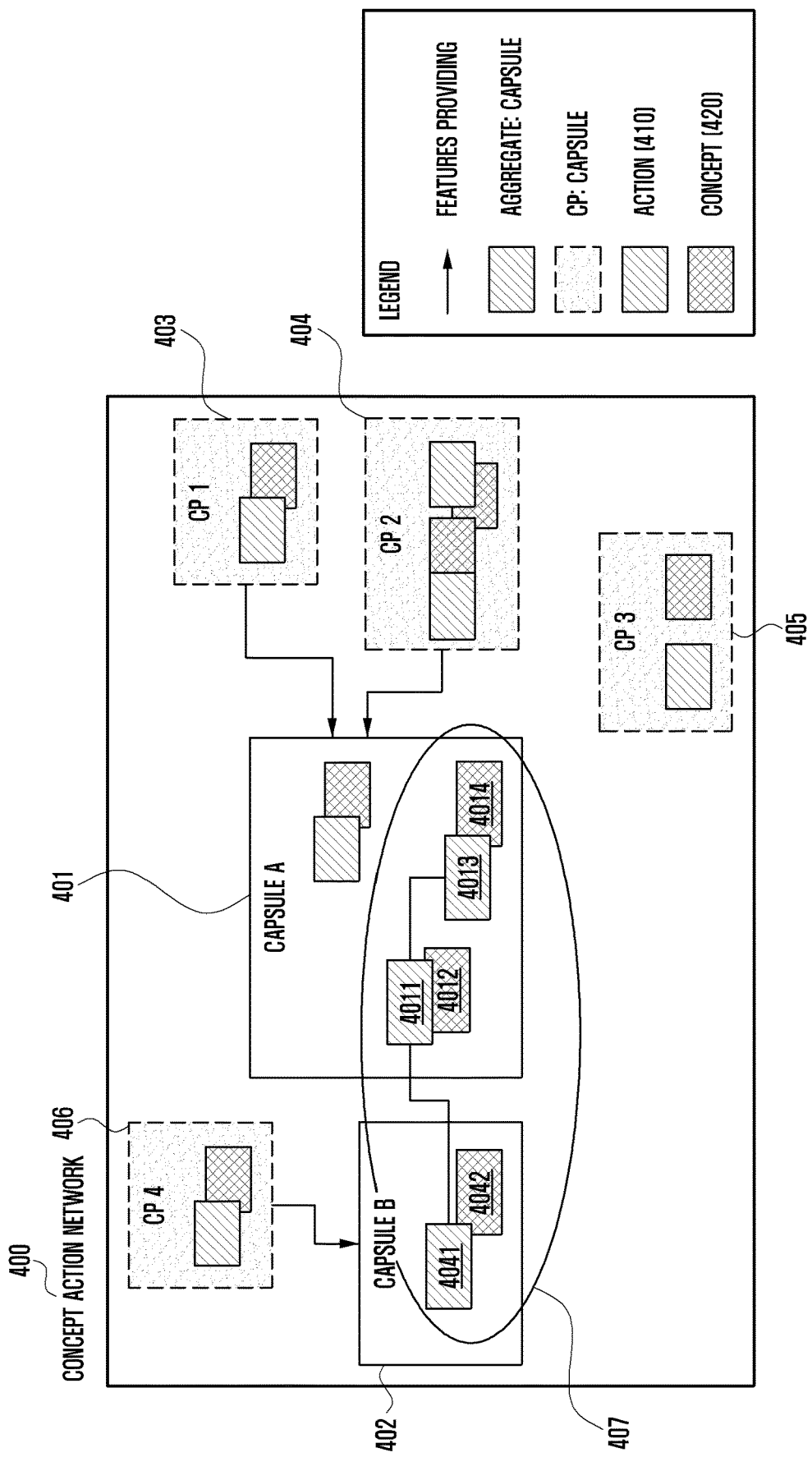
FIG. 4 is a diagram illustrating a form in which information about a relationship between a concept and an action is stored in a database according to various embodiments.

FIG. 4 is a diagram illustrating an example form in which information about a relationship between a concept and an action is stored in a database according to various embodiments.

A capsule DB (e.g., the capsule database DB 323) of the intelligent server 302 may store a capsule in the form of a concept action network (CAN) 400. The capsule DB may store an operation of processing a task corresponding to a voice input from a user and a parameter required for the operation in the form of a concept action network (CAN). The CAN may show a systematic relationship between an action and a concept defining a parameter required to perform the action.

The capsule DB may store a plurality of capsules (e.g., capsule A 401 and capsule B 402) respectively corresponding to a plurality of domains (e.g., applications). According to an embodiment, one capsule (e.g., capsule A 401) may correspond to one domain (e.g., application). Further, one capsule may correspond to at least one service provider (e.g., CP 1 403, CP 2 404, CP 3 405, or CP 4 406) for performing a function for a domain related to the capsule. According to an embodiment, one capsule may include at least one action 410 and at least one concept 420 for performing a specified function.

According to an embodiment, the natural language platform 322 may generate a plan for performing a task corresponding to a received voice input using a capsule stored in the capsule DB. For example, the planner module 322c of the natural language platform 322 may generate the plan using the capsule stored in the capsule DB. For example, the planner module 322c may generate a plan 407 using actions 4011 and 4013 and concepts 4012 and 4014 of capsule A 401 and an action 4041 and a concept 4042 of capsule B 402.

Figure 5:
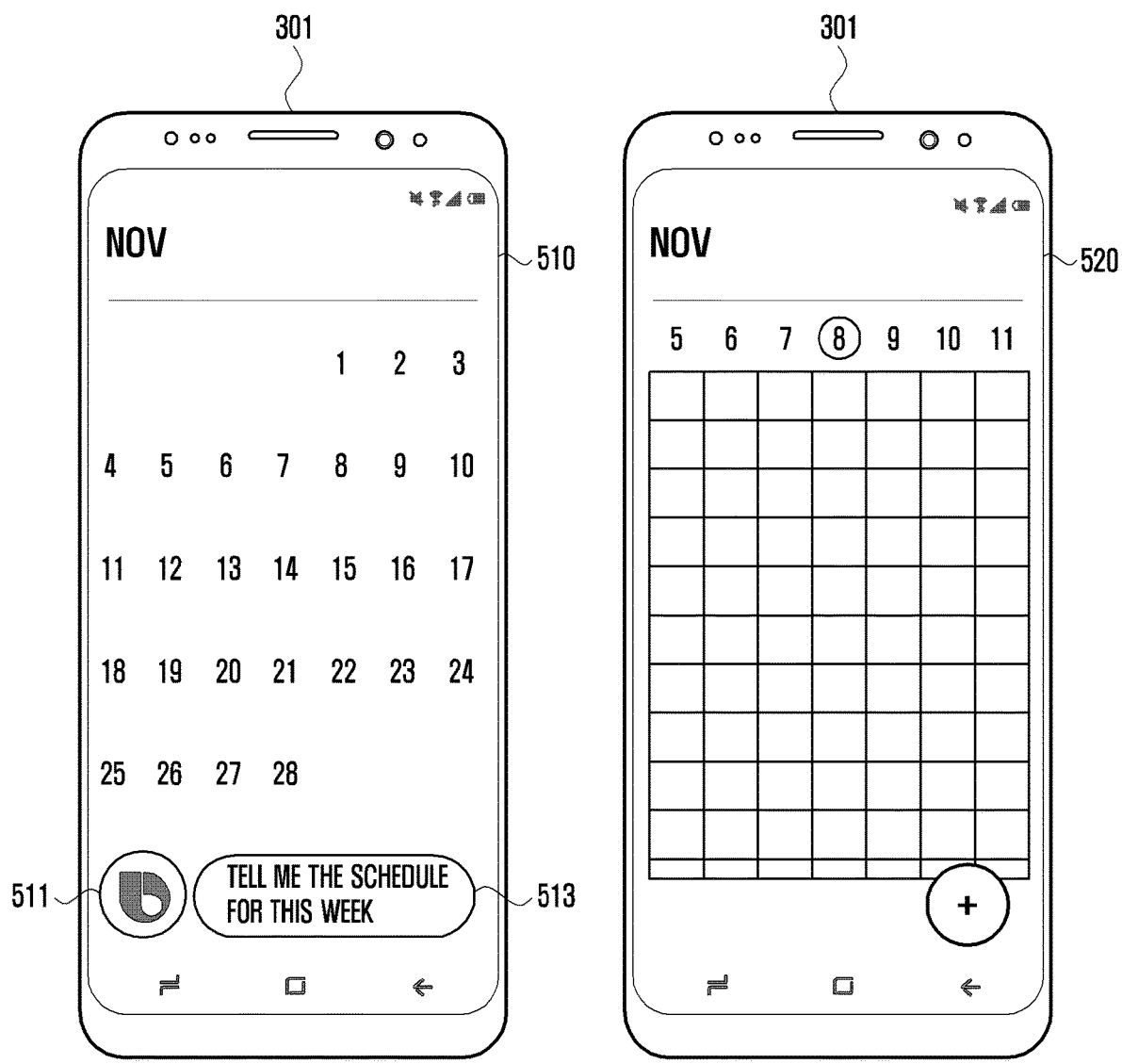
FIG. 5 is a diagram illustrating a screen for a user terminal to process a received voice input through an intelligent application according to various embodiments.

FIG. 5 is a diagram illustrating an example screen for a user terminal to process a received voice input through an intelligent application according to various embodiments.

The user terminal 301 may execute an intelligent application to process a user input through the intelligent server 302.

According to an embodiment, when recognizing a designated voice input (e.g., Wake up!) or receiving an input via a hardware key (e.g., a dedicated hardware key), the user terminal 301 may execute the intelligent application for processing the voice input on screen 510. For example, the user terminal 301 may execute the intelligent application in a state in which a schedule application is executed. According to an embodiment, the user terminal 301 may display an object (e.g., an icon) 511 corresponding to the intelligent application on the display 314. According to an embodiment, the user terminal 301 may receive a voice input based on a user utterance. For example, the user terminal 301 may receive a voice input "Tell me the schedule for this week!" According to an embodiment, the user terminal 301 may display a user interface (UI, e.g., an input window) 513 of the intelligent application displaying text data of the received voice input on the display.

According to an embodiment, the user terminal 301 may display a result corresponding to the received voice input on screen 520 on the display. For example, the user terminal 301 may receive a plan corresponding to the received user input and may display "Schedule for this week" according to the plan on the display.

Figure 6:
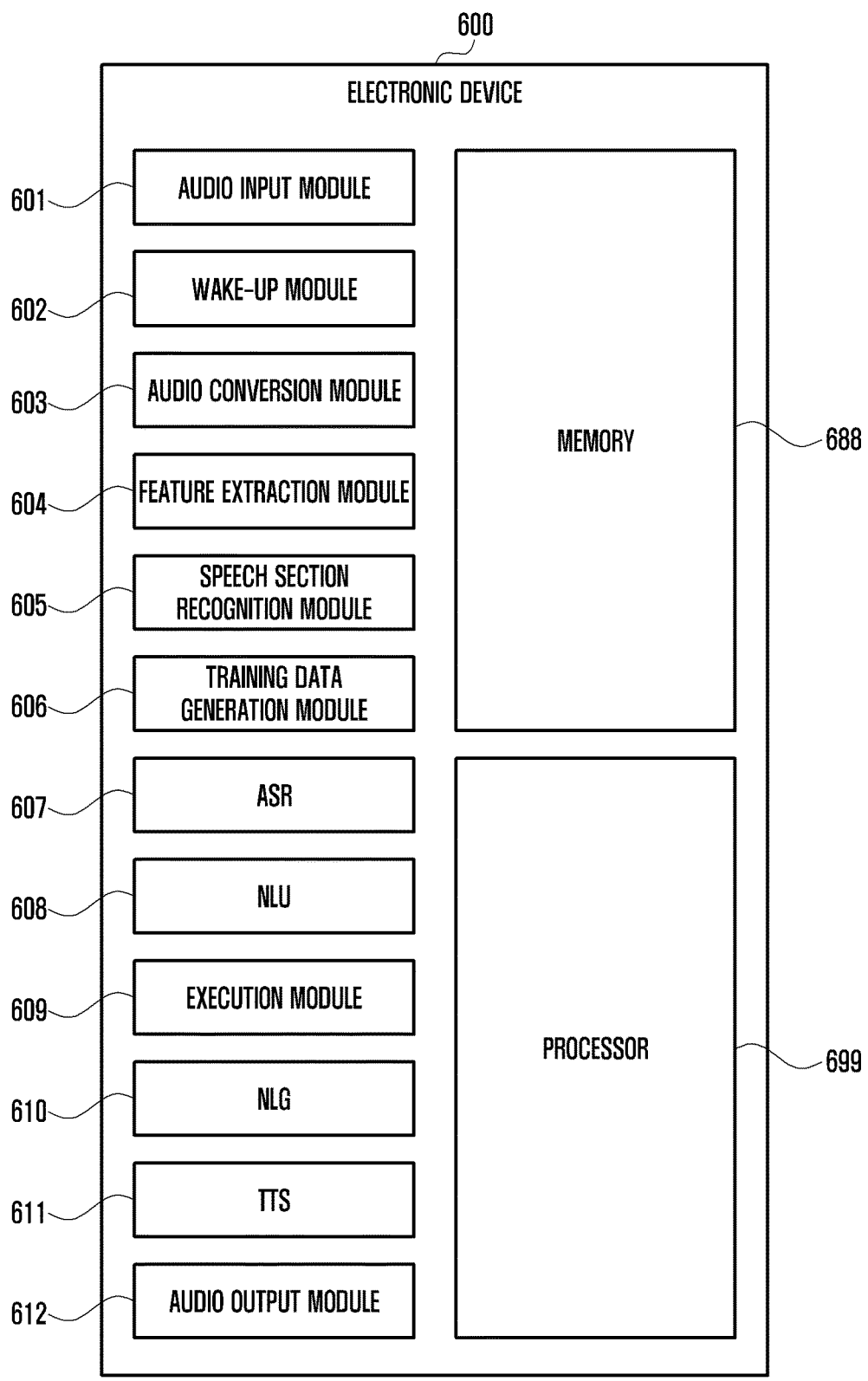
FIG. 6 is a block diagram illustrating an example configuration of an electronic device configured to provide a noise-resistant voice assistant service according to various embodiments.
Figure 7:
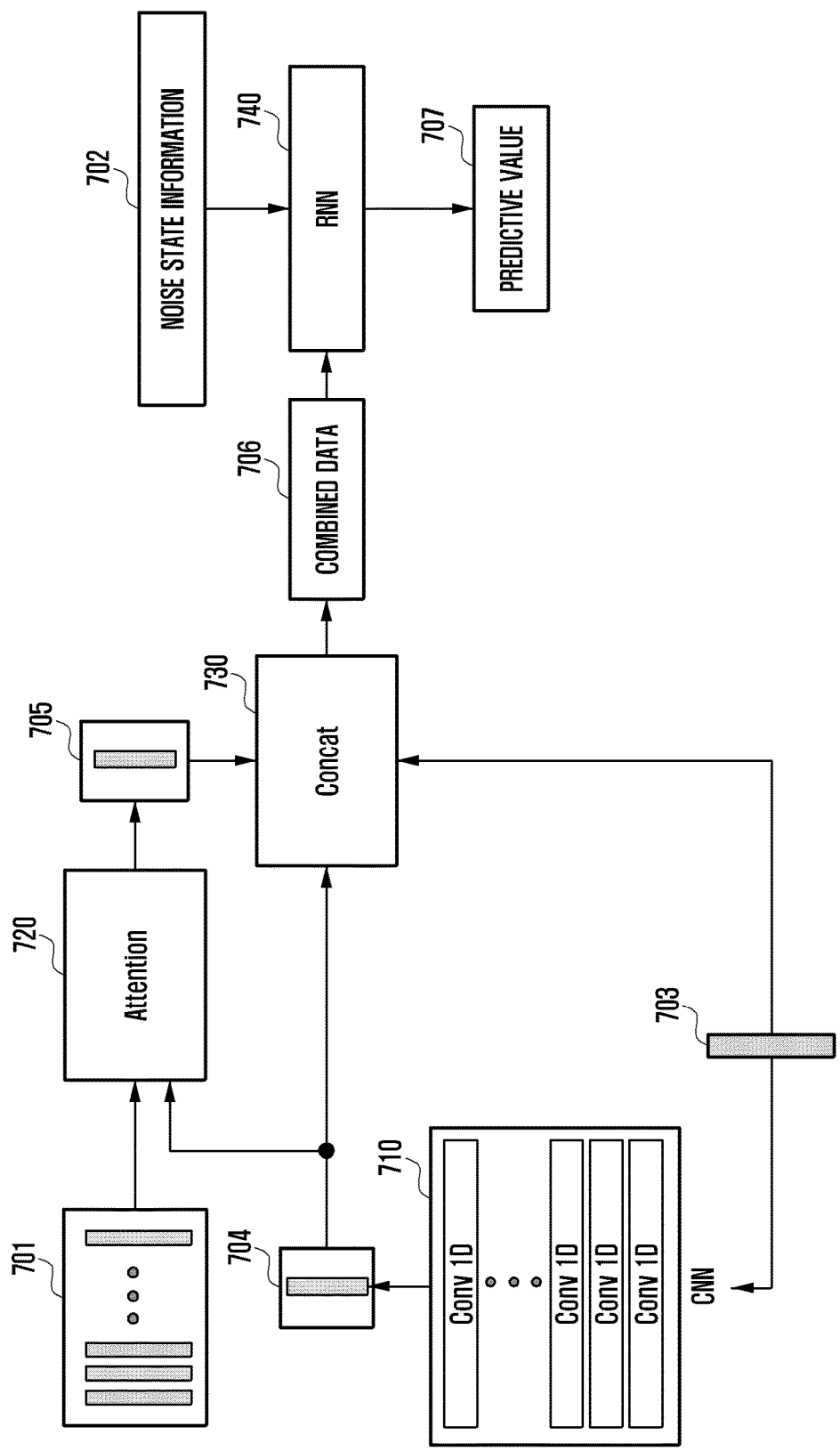
FIG. 7 is a block diagram illustrating a speech section recognition module of FIG. 6 according to various embodiments.
Figure 8:
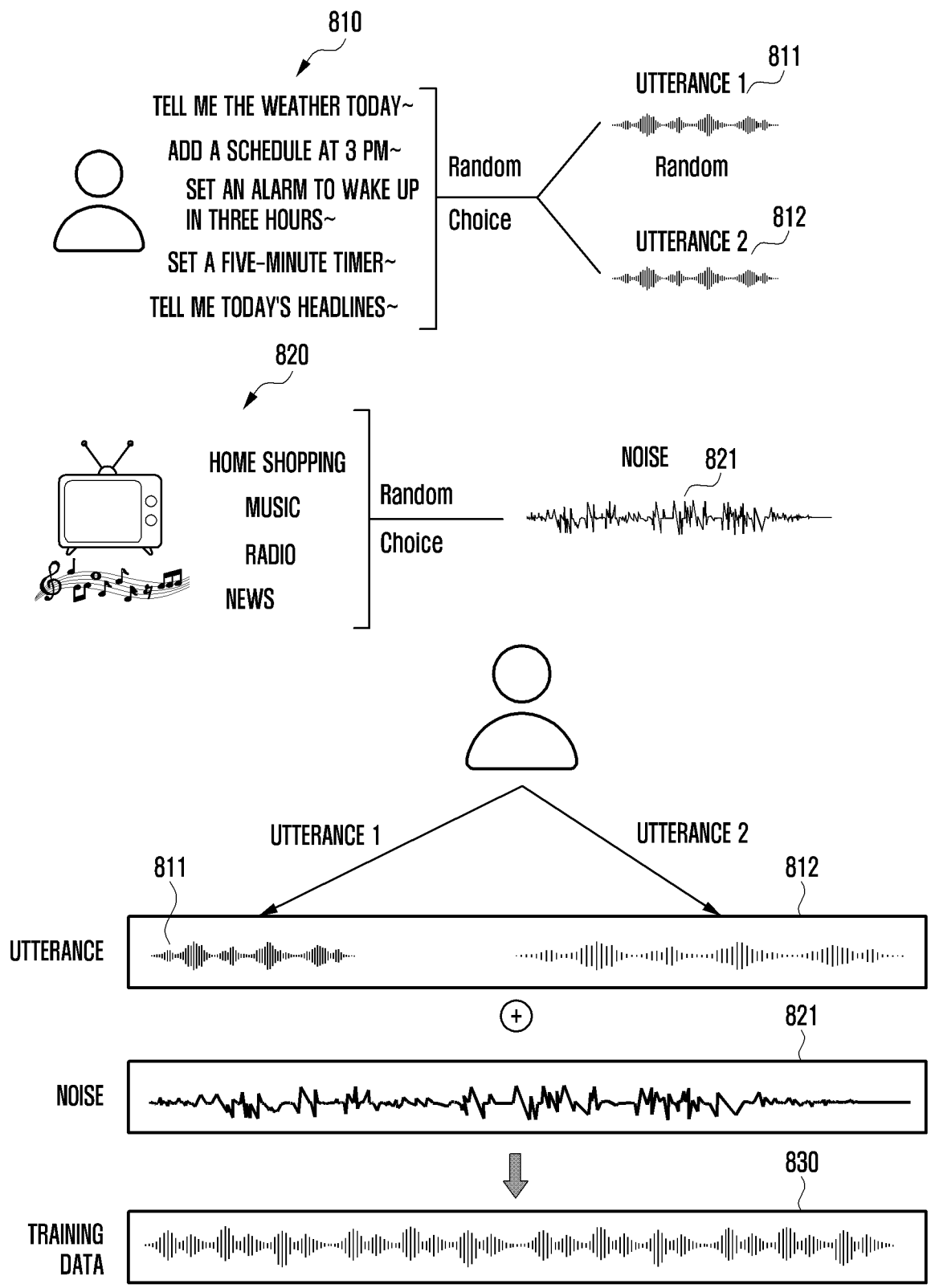
FIG. 8 is a diagram illustrating an example of an operation of generating training data used to recognize a speech section according to various embodiments.

FIG. 6 is a block diagram illustrating an example configuration of an electronic device 600 configured to provide a noise-resistant voice assistant service according to various embodiments. FIG. 7 is a block diagram illustrating an example configuration of the speech section recognition module 605 of FIG. 6 according to various embodiments. FIG. 8 is a diagram illustrating an example of an operation of generating training data used to recognize a speech section according to various embodiments. Referring to FIG. 6, the electronic device 600 (e.g., the electronic device 101 of FIG. 1) may include an audio input module (e.g., including audio input circuitry) 601, a wake-up module (e.g., including circuitry and/or executable program instructions) 602, an audio conversion module (e.g., including conversion circuitry and/or executable program instructions) 603, a feature extraction module (e.g., including various processing circuitry and/or executable program instructions) 604, a speech section recognition module (e.g., including various processing circuitry and/or executable program instructions) 605, a training data generation module (e.g., including various processing circuitry and/or executable program instructions) 606, an ASR (e.g., including various processing circuitry and/or executable program instructions) 607, an NLU (e.g., including various processing circuitry and/or executable program instructions) 608, an execution module (e.g., including various processing circuitry and/or executable program instructions) 609, an NLG (e.g., including various processing circuitry and/or executable program instructions) 610, a TTS (e.g., including various processing circuitry and/or executable program instructions) 611, an audio output module (e.g. including audio output circuitry) 612, a memory 688, and/or a processor (e.g., including processing circuitry) 699. The foregoing components of the electronic device 600 may be operatively or electrically connected to each other.

The audio input module 601 may include various audio input circuitry and receive an audio signal. For example, the audio input module 601 may receive an audio signal from a microphone configured in the input module 150 of FIG. 1. The audio input module 601 may receive an audio signal from an external device (e.g., a headset or a microphone) connected via a cable through an audio connector configured in the connection terminal 178 of FIG. 1. The audio input module 601 may receive an audio signal from an external device wirelessly (e.g., via Bluetooth communication) connected to the electronic device 600 through a wireless communication circuit (e.g., the wireless communication module 192 of FIG. 1).

The wake-up module 602 may recognize that a user calls an AI agent (or voice assistant). In an embodiment, the wake-up module 602 may receive an audio signal from the audio input module 601 and may recognize an utterance (e.g., Hi Bixby) designated to call the AI agent (or to drive the AI agent) in the received audio signal. For example, the wake-up module 602 may detect the starting point and the end point of the user utterance in the audio signal, thereby obtaining a part including the user utterance (e.g., a first part corresponding to 'High' and a second part corresponding to 'Bixby') in the audio signal. The wake-up module 602 may compare the obtained utterance part with voice data previously stored, thereby determining whether the audio signal includes a call utterance (or a driving utterance). In an embodiment, the wake-up module 602 may support the user to call the AI agent using a method other than a voice. For example, the wake-up module 602 may recognize two consecutive presses of a power key of the input module 150 as a call. In another example, the wake-up module 602 may recognize a touch input received from a touch circuit of the display module 160 as a call.

The audio conversion module 603 may convert a format in which an audio signal is formed to facilitate voice activity detection. For example, the audio conversion module 603 may convert a time-domain audio signal received from the audio input module 601 into a frequency-domain spectral signal using a Fourier transform (e.g., discrete Fourier transform (DFT) or fast Fourier transform (FFT)) function every frame (e.g., about 20 ms). The audio conversion module 603 may convert the frequency-domain spectral signal into a mel-scaled spectrogram signal. For example, the audio conversion module 603 may convert a component of a designated frequency or higher (e.g., about 1 kHz or higher, which is relatively less sensitive to human hearing) of a spectral signal in a log scale using a filter called "mel filter bank", thereby converting a spectral signal of each frame into a spectrogram signal (e.g., a log-mel signal).

The feature extraction module 604 may extract information representing a feature of audio from an audio signal.

In an embodiment, the feature extraction module 604 may extract audio feature information (e.g., a voice and noise feature vector) including information indicating a feature of the voice of a speaker in the audio signal and information indicating a feature of a noise around the speaker in the audio signal. For example, in an embodiment, the feature extraction module 604 may perform an extraction operation as a call utterance (e.g., High Bixby) is recognized by the wake-up module 602. The feature extraction module 604 may receive a spectrogram signal from the audio conversion module 603 and may extract a voice and noise feature vector from the spectrogram signal.

In an embodiment, the feature extraction module 604 may extract audio feature information (e.g., a noise feature vector) including information indicating a feature of a noise around the speaker from an audio signal. For example, the speaker (user) may call the AI agent using a key input (e.g., a power key input or a touch input) rather than a call utterance. In response to this call, the feature extraction module 604 may perform an extraction operation. The feature extraction module 604 may extract a noise feature vector from a spectrogram signal received from the audio conversion module 603.

In an embodiment, the feature extraction module 604 may extract information indicating a feature of audio (e.g., a voice and noise feature vector indicating features of the voice of the speaker and a noise around the speaker or a noise feature vector indicating a feature of a noise around the speaker) from an audio signal using pre-prepared training data. The training data is a combination of the speaker's (user's) utterance and a noise and may be stored in the memory 688.

In an embodiment, the feature extraction module 604 may extract audio feature information including a feature vector and noise state information from an audio signal using a model trained using an artificial intelligence algorithm. For example, the feature extraction module 604 may extract a feature vector (e.g., a voice and noise feature vector or a noise feature vector) from an audio signal (e.g., a log-mel signal) (hereinafter, "audio frame"), received by a unit of a frame from the audio input module 601 through the audio conversion module 603, using a CNN model trained using training data and stored in the memory 688. When the audio frame is entered into the CNN model as an input value, the CNN model may output the feature vector. When the entire section of an audio signal from which a feature is to be extracted is 1.6 seconds and one audio frame is 20 ms, the total number of audio frames input to the feature extraction module 604 is 80 (1/6 seconds/20 ms), and accordingly a total of 80 feature vectors may be output from the feature extraction module 604. The feature extraction module 604 may extract noise state information indicating a temporal change in noise around the speaker in the entire section of the audio signal using an RNN model trained using training data and stored in the memory 688. When the entire section of the audio signal is entered into the RNN model as an input value, the RNN model may output the noise state information. Various artificial intelligence models may be used to extract audio feature information without being limited to the CNN model and the RNN model illustrated above.

The speech section recognition module 605 may recognize a speech section in a second audio signal, based on audio feature information about a first audio signal extracted by the feature extraction module 604. The second audio signal may include an audio signal received by the audio input module 601 after the first audio signal is received by the audio input module 601.

According to an embodiment, the feature extraction module 604 may receive the first audio signal including a first utterance (e.g., a call utterance) of the speaker from the audio input module 601 through the audio conversion module 603 and may extract audio feature information from the first audio signal. The speech section recognition module 605 may receive the second audio signal including a second utterance (e.g., a subsequent utterance after the call utterance) of the speaker from the audio input module 601 through the audio conversion module 603 and may distinguish a noise section, in which there is only an ambient noise without any utterance of the speaker, and a speech section, in which there is an utterance of the speaker, in the second audio signal using the audio feature information of the first audio signal. When the second utterance is, for example, "Tell me the weather today," the speech section recognition module 605 may recognize a speech section including the starting point and the end point of "today", a speech section including the starting point and the end point of "the weather", and a speech section including the starting point and the end point of "tell me" in the second audio signal using the audio feature information of the first audio signal.

According to an embodiment, the speech section recognition module 605 may divide audio frames of the second audio signal into a voice frame including a voice signal and a noise frame including no voice signal using an artificial intelligence model (e.g., a CNN model 710 and an RNN model 740 of FIG. 7) generated through machine learning and the audio feature information of the first audio signal, thereby recognizing a speech section(s) in the second audio signal.

Referring to FIG. 7, the speech section recognition module 605 may receive feature vectors (FV1_1, FV1_2, . . . , FV1_N) 701 of the first audio signal and noise state information 702 of the first audio signal. FV1 may refer, for example, to a feature vector extracted from a frame of the first audio signal, and "1, 2, . . . , and N" may refer to respective frame numbers. The speech section recognition module 605 may receive the audio frames "Frame (F)2_1, F2_2, . . . , and F2_M" of the second audio signal from the audio input module 601 through the audio conversion module 603. F2 may refer, for example, to a frame of the second audio signal, and "1, 2, . . . , M" may refer to respective frame numbers. The speech section recognition module 605 may extract a feature vector FV2_$m$ (where m is 1, 2, . . . , or M) 704 from F2_$m$ 703 using the CNN model 710 including a plurality of artificial neural network layers. FV2_$m$ may refer, for example, to a feature vector extracted from an mth frame of the second audio signal. When F2_$m$ 703 is input to the CNN model 710 as an input value, the CNN model 710 may output the feature vector FV2_$m$ 704. The speech section recognition module 605 may calculate an attention value (AV_m) 705 indicating the similarity of the feature vector FV2_$m$ to the feature vectors 701 of the first audio signal using an attention mechanism 720 (e.g., dot product attention). The speech section recognition module 605 may combine F2_$m$ 703, FV2_$m$ 704, and AV_m 705 into one data (concatenation (C)_m) 706 using a concatenation mechanism 730. The speech section recognition module 605 may recognize whether there is a voice in F2_$m$ 703 from C_m 706 and the noise state information 702 using the RNN model 740 including a plurality of artificial neural network layers. For example, when the noise state information 702 is input to the RNN model 740, the RNN model 740 may be configured to an initial state of being operable to output an output value. When the combined data 706 is input as an input value into the RNN model 740 configured to the initial state, the RNN model 740 may output a predictive value (predict value (PV)_m) 707 indicating whether a voice exists in "F2_$m$" 703, which is the mth audio frame of the second audio signal. The speech section recognition module 605 may determine whether F2_$m$ 703 is a voice frame, based on the PV_m 707. Further, the speech section recognition module 605 may recognize whether the F2_$m$ 703 is the starting point, the end point, or an intermediate point of the user utterance, based on predictive values output from the RNN model 740. For example, when PV_m−1 is determined as a noise frame and PV_m is determined as a voice frame, the speech section recognition module 605 may recognize PV_m 707 as the starting point of the speech section.

According to an embodiment, the feature extraction module 604 may extract audio feature information from the second audio signal, and the voice section recognition module 605 may use the audio feature information extracted from the second audio signal to recognize a speech section in a third audio signal.

The training data generation module 606 may generate training data for training an artificial intelligence model (e.g., a CNN model or a RNN model) used to extract audio feature information by composing speech data of the user (speaker) and noise data. For example, referring to FIG. 8, the training data generation module 606 may randomly select one or more pieces of utterance data on an utterance list 810. For example, the training data generating module 606 may select preceding utterance data 811 and subsequent uttering data 812 from the utterance list 810. The training data generation module 606 may randomly select one piece of noise data 821 on a noise list (e.g., a TV noise list) 820. The training data generation module 606 may combine the preceding utterance data 811 and the subsequent uttering data 812 with the noise data 821 in chronological order, thereby generating training data 830. Although not shown, the training data generation module 606 may generate training data by combining only the subsequent utterance data 812 with the noise data 821 without the preceding utterance data 811. Speech data corresponding to an actual driving utterance (e.g., High Bixby) may be selected as the preceding utterance data 811.

The ASR 607 (e.g., the automatic speech recognition module 322*a* of FIG. 3) may convert a voice signal within the speech section recognized by the speech section recognition module 605 in the second audio signal into text data. The NLU 608 (e.g., the natural language understanding module 322*b* of FIG. 3) may determine the user's intent (e.g., an execution command) using text data. The execution module 609 (e.g., the execution engine 324 of FIG. 3) may execute a function corresponding to a user intent. The NLG 610 (e.g., the natural language generator module 322*d* of FIG. 3) may change designated information (e.g., an execution result) into a text form. The TTS 611 (e.g., the text-to-speech module 322*e* of FIG. 3) may change information in a text form into a voice signal.

The audio output module 612 may include various audio output circuitry and output a voice signal received from the TTS 611. For example, the audio output module 612 may output a voice signal to a speaker configured in the sound output module 155 of FIG. 1. The audio output module 612 may output a voice signal to an external device (e.g., a headset or a speaker) connected via a cable through an audio connector configured in the connection terminal 178 of FIG. 1. The audio output module 612 may output a voice signal to an external device wirelessly (e.g., via Bluetooth communication) connected to the electronic device 600 through a wireless communication circuit (e.g., the wireless communication module 192 of FIG. 1).

At least one of the modules 601, 602, 603, 604, 605, 606, 607, 608, 609, 610, 611, and 612 may be stored as instructions in the memory 588 (e.g., the memory 130 of FIG. 1) and may be executed by the processor 599 (e.g., the processor 120 of FIG. 1). At least one of the modules 601, 602, 603, 604, 605, 606, 607, 608, 609, 610, 611, and 612 may be executed by a processor (e.g., the coprocessor 123) specializing in processing an artificial intelligence model. At least one of the modules 601, 602, 603, 604, 605, 606, 607, 608, 609, 610, 611, and 612 may be omitted from the electronic device 600. For example, at least one of the audio conversion module 603, the feature extraction module 604, the speech section recognition module 605, the training data generation module 606, the ASR 607, the NLU 608, the execution module 609, the NLG 610, and the TTS 611 may be configured in an external device (e.g., the server 108 of FIG. 1).

Figure 9:
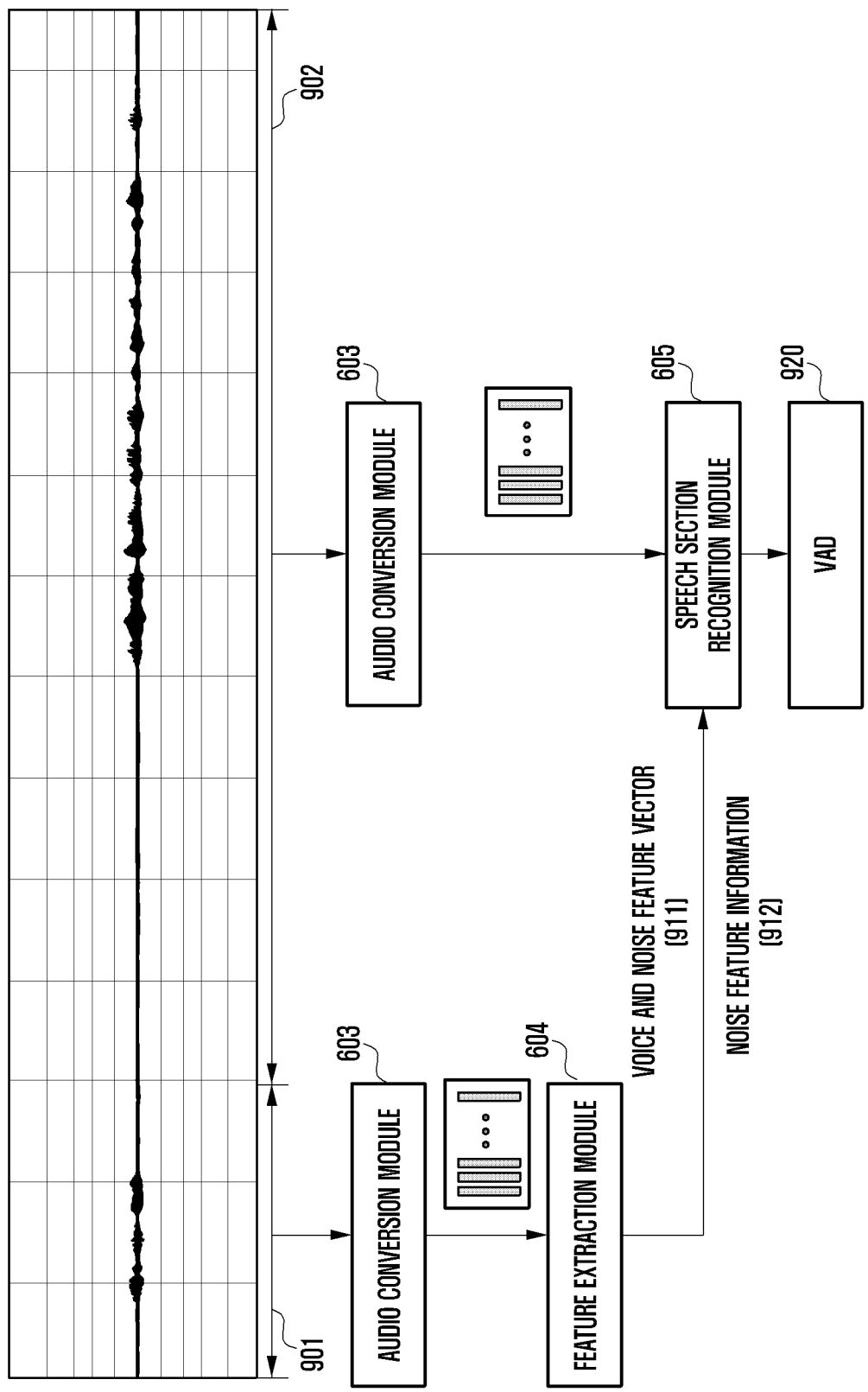
FIG. 9 is a diagram illustrating example operations of an audio conversion module, a feature extraction module, and a speech section recognition module according to various embodiments.

FIG. 9 is a diagram illustrating example operations of the audio conversion module 603, the feature extraction module 604, and the speech section recognition module 605 according to various embodiments.

A description of a configuration overlapping the foregoing configuration of FIG. 6 may not be repeated here or may be briefly made. Referring to FIG. 9, the audio conversion module 603 may convert a first audio signal 901 including a call utterance into a designated format for each frame and may output the converted first audio signal 901 to the feature extraction module 604. The feature extraction module 604 may extract a voice and noise feature vector 911 and noise feature information 912 from the first audio signal 901 with the converted format and may transmit the voice and noise feature vector 911 and the noise feature information 912 to the speech section recognition module 605. The audio conversion module 603 may convert a second audio signal 902 after the first audio signal 901 into the same format and may transmit the second audio signal 902 to the speech section recognition module 605. For example, the audio conversion module 603 may recognize the end point of the call utterance through the wake-up module 602 and may change a recipient to receive the subsequently received second audio signal 902 from the feature extraction module 604 to the speech section recognition module 605. The speech section recognition module 605 may recognize a speech section in the second audio signal 902 with the converted format, based on the voice and noise feature vector 911 and the noise feature information 912 and may output VAD information 920 indicating the speech section.

Figure 10:
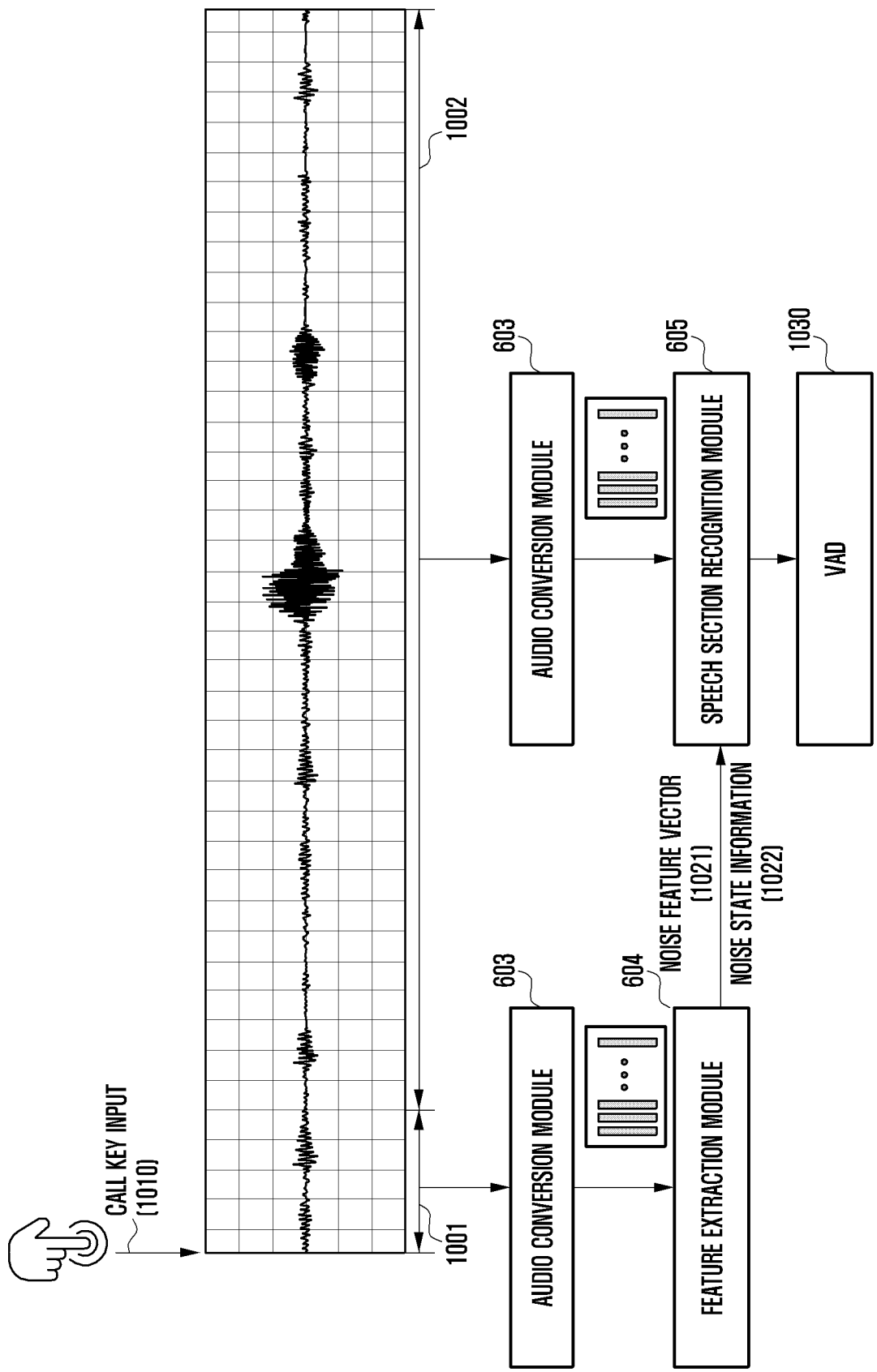
FIG. 10 is a diagram illustrating example operations of an audio conversion module, a feature extraction module, and a speech section recognition module according to various embodiments.

FIG. 10 is a diagram illustrating example operations of the audio conversion module 603, the feature extraction module 604, and the speech section recognition module 605 according to various embodiments.

A description of a configuration overlapping the foregoing configuration of FIG. 6 may not be repeated here or may be briefly made. Referring to FIG. 10, the audio conversion module 603 may recognize a call key input 1010 through the wake-up module 602, and accordingly may convert a first audio signal 1001 into a designated format for each frame and may output the converted first audio signal 1001 to the feature extraction module 604 within a designated time from when the call key input 1010 is recognized. The feature extraction module 604 may extract a noise feature vector 1021 and noise feature information 1022 from the first audio signal 1001 with the converted format and may transmit the noise feature vector 1021 and the noise feature information 1022 to the speech section recognition module 605. The audio conversion module 603 may convert a second audio signal 1002 after the first audio signal 1001 into the same format and may transmit the second audio signal 1002 to the speech section recognition module 605. For example, the audio conversion module 603 may recognize the expiration of the designated time and may transmit the subsequently received second audio signal 1002 to the speech section recognition module 605. The speech section recognition module 605 may recognize a speech section(s) in the second audio signal 1002 with the converted format, based on the noise feature vector 1021 and the noise feature information 1022 and may output VAD information 1030 indicating the speech section.

Figure 11:
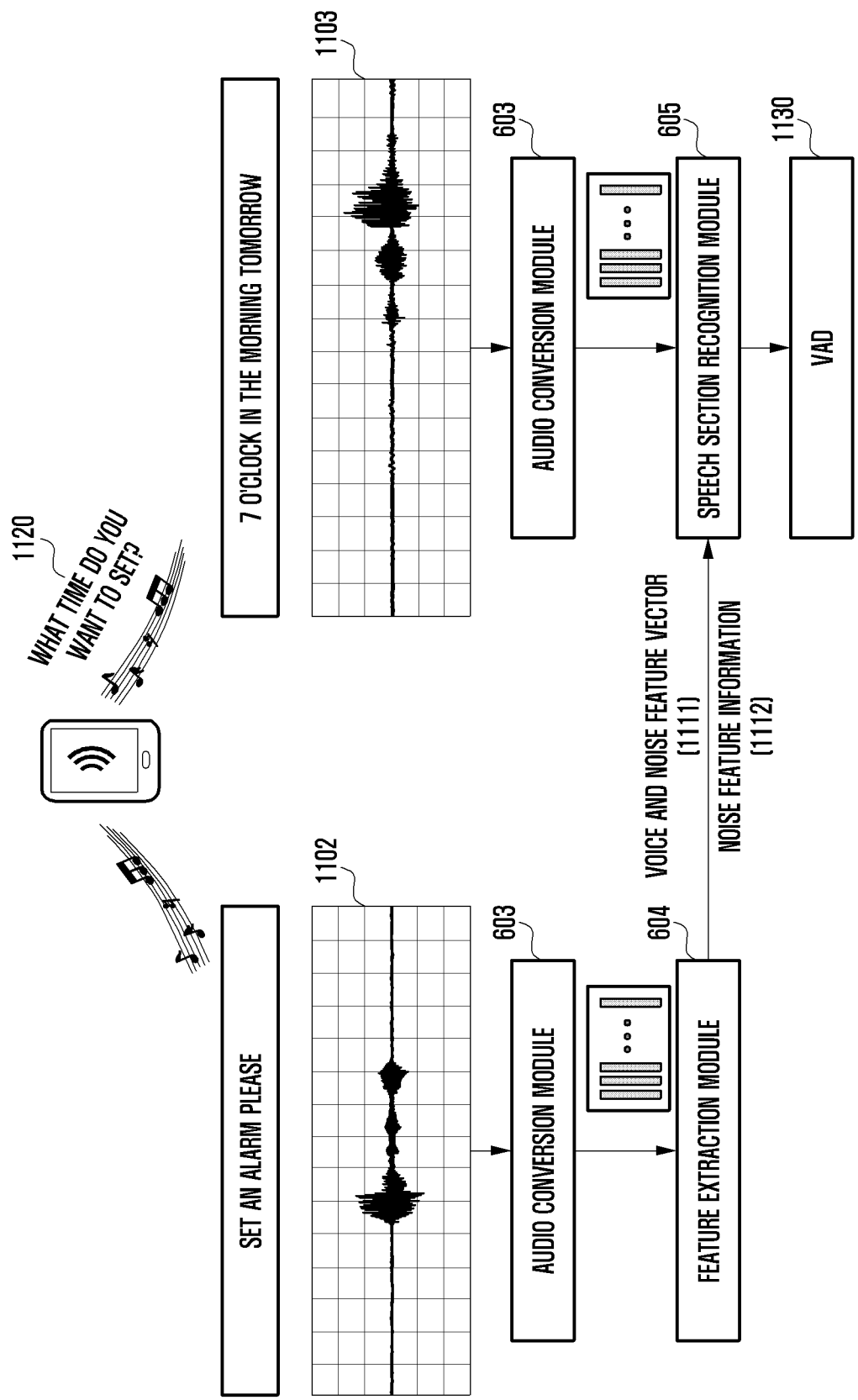
FIG. 11 is a diagram illustrating example operations of an audio conversion module, a feature extraction module, and a speech section recognition module according to various embodiments.

FIG. 11 is a diagram illustrating example operations of the audio conversion module 603, the feature extraction module 604, and the speech section recognition module 605 according to various embodiments.

A description of a configuration overlapping the configuration of FIG. 6 may not be repeated here or may be briefly made. Referring to FIG. 11, the audio conversion module 603 may convert a second audio signal 1102 (e.g., the second audio signal 902 of FIG. 9 or the second audio signal 1002 of FIG. 10) including a speaker's utterance (e.g., a first main utterance (e.g., "Set an alarm please") after a call utterance) into a designated format for each frame and may output the converted second audio signal 1102 to the feature extraction module 604. The feature extraction module 604 may extract a voice and noise feature vector 1111 and noise feature information 1112 from the second audio signal 1102 with the converted format and may transmit the voice and noise feature vector 1111 and the noise feature information 1112 to the speech section recognition module 605. The audio conversion module 603 may convert a third audio signal 1103 after the second audio signal 1102 into the same format and may transmit the third audio signal 1103 to the speech section recognition module 605. For example, the audio conversion module 603 may recognize that a voice 1120 (e.g., "What time do you want to set?") of an AI agent is output through the audio output module 612 in response to the user's utterance and may transmit the subsequently received third audio signal 1103 to the speech section recognition module 605. The speech section recognition module 605 may recognize a speech section(s) (e.g., a speech section corresponding to "tomorrow", a speech section corresponding to "in the morning", and a speech section corresponding to "7 o'clock") in the third audio signal 1103 with the converted format, based on the voice and noise feature vector 1111 and the noise feature information 1112 and may output VAD information 1130 indicating the speech section.

Figure 12:
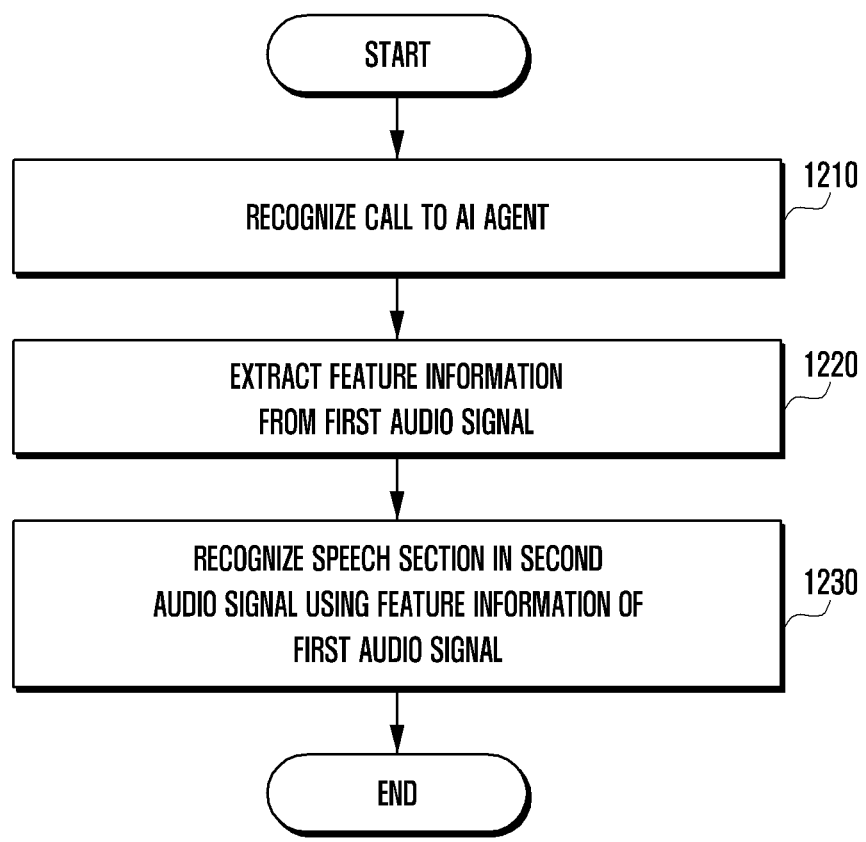
FIG. 12 is a flowchart illustrating example operations of recognizing a speech section according to various embodiments.

FIG. 12 is a flowchart illustrating example operations of recognizing a speech section according to various embodiments.

In operation 1210, the processor 699 may recognize a user input to call an AI agent through an input device. For example, the processor 699 may recognize a designated call utterance (e.g., Hi Bixby) in a first audio signal received from a microphone. In another example, the processor 699 may recognize a key input received from a physical button or a soft button displayed on a display as a key input to call the AI agent.

In operation 1220, the processor 699 may extract feature information from the first audio signal received from the microphone in response to calling the AI agent. In an embodiment, the processor 699 may convert the first audio signal to have a designated format. For example, the processor 699 may convert the first audio signal from a time-domain audio frame into a frequency-domain audio frame by a unit of a designated frame. The processor 699 may convert the frequency-domain audio frame into a mel-scaled audio frame using a filter (e.g., a mel filter bank). The processor 699 may enter the mel-scaled audio frame into a CNN model as an input value and may identify a feature vector (e.g., a voice and noise feature vector or a noise feature vector) indicating a feature of the audio frame (input value) in a result value output from the CNN model. The processor 699 may enter mel-scaled audio frames corresponding to the entire section of the first audio signal into an RNN model as an input value and may identify noise state information indicating a temporal change in noise around the speaker in the entire section (input value) of the first audio signal in a result value output from the RNN model.

In operation 1230, the processor 699 may recognize a speech section in a second audio signal using the feature information of the first audio signal. In an embodiment, the processor 699 may convert the second audio signal to have the same format as the first audio signal with the converted format. For example, the processor 699 may convert the second audio signal from a time-domain audio frame into a frequency-domain audio frame for each frame. The processor 699 may convert the frequency-domain audio frame into a mel-scaled audio frame using a filter (e.g., a mel filter bank). For example, the processor 699 may enter the audio frame "F2_$m$" of the second audio signal into the CNN model as an input value and may identify a feature vector "FV2_$m$" indicating a feature of F2_$m$ from a result value output from the CNN model. The processor 699 may calculate "AV_m" indicating the similarity of FV2_$m$ to feature vectors of the first audio signal. The processor 699 may combine F2_$m$, FV2_$m$, and AV_m into one data "C_m". The processor 699 may enter the noise state information of the first audio signal into the RNN model as an input value, thereby configuring the RNN model to an initial state of being operable to output an output value. The processor 699 may enter C_m into the RNN model as an input value and may identify a predictive value "PV_m" indicating whether a voice exists in F2_$m$ in a result value output from the RNN model. The processor 699 may determine F2_$m$ as a voice frame or a noise frame, based on PV_m. When F2_$m$ is a voice frame, the processor 699 may determine whether F2_$m$ is the starting point of the speech section, the end point of the speech section, or a voice frame within the speech section, based on result values output from the RNN model. For example, when F2_$m$−1 is determined as a noise frame and F2_$m$ is determined as a voice frame, the processor 699 may recognize F2_$m$ as the starting point of the speech section. When F2_$m$ is determined as a voice frame and F2_$m$+1 is determined as a noise frame, the processor 699 may recognize F2_$m$ as the end point of the speech section. When all of F2_$m$−1, F2_$m$, and F2_$m$+1 are determined as voice frames, the processor 699 may determine F2_$m$ as a voice frame within the speech section. The processor 699 may determine whether all frames F2_1, F2_2, . . . , F2_M of the second audio signal are voice frames, thereby recognizing a speech section(s) in the second audio signal.

Figure 13:
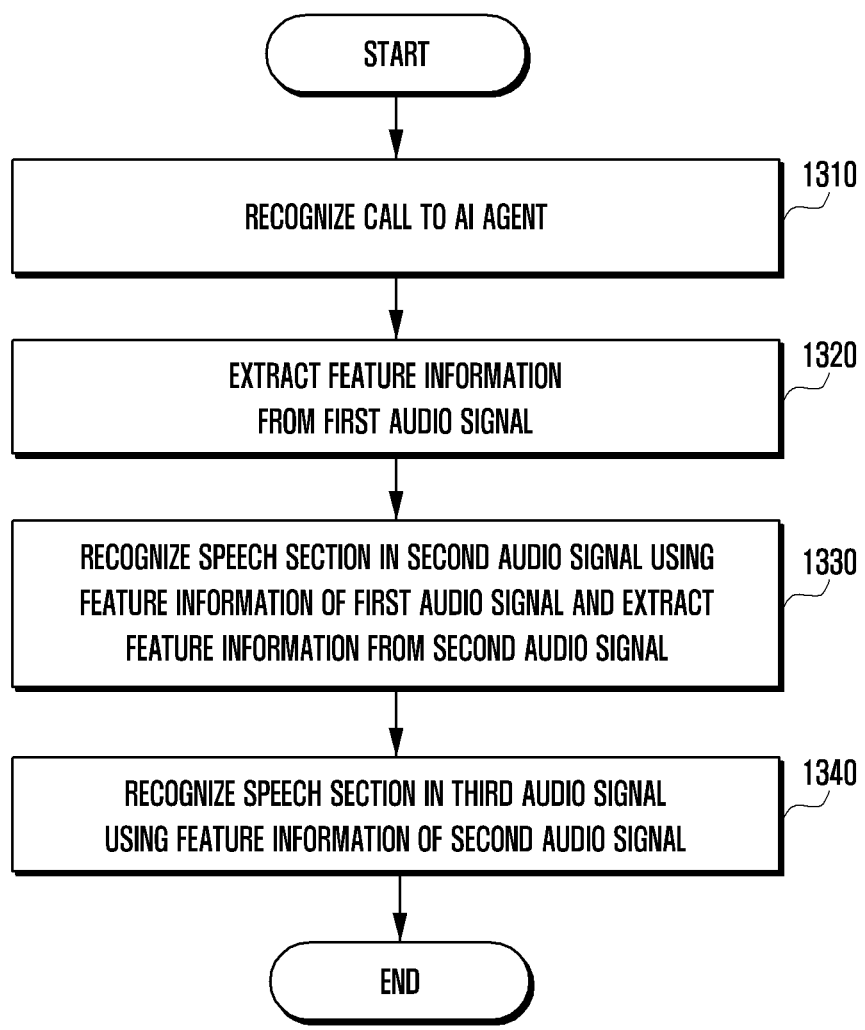
FIG. 13 is a flowchart illustrating example operations of recognizing a speech section according to various embodiments.

FIG. 13 is a flowchart illustrating example operations of recognizing a speech section according to various embodiments.

In operation 1310, the processor 699 may recognize a user input to call an AI agent through an input device. For example, the processor 699 may recognize a designated call utterance (e.g., Hi Bixby) in a first audio signal received from a microphone. In another example, the processor 699 may recognize a key input received from a physical button or a soft button displayed on a display as a key input to call the AI agent.

In operation 1320, the processor 699 may extract feature information from the first audio signal received from the microphone in response to calling the AI agent. For example, the processor 699 may extract the feature information in the same manner as in operation 1220.

In operation 1330, the processor 699 may recognize a speech section in a second audio signal using the feature information of the first audio signal and may extract feature information from the second audio signal. For example, the processor 699 may recognize the speech section(s) (e.g., a speech section corresponding to "an alarm", a speech section corresponding to "set", and a speech section corresponding to "please") in the second audio signal in the same manner as in operation 1230. The processor 699 may extract the feature information from the second audio signal in the same manner as in operation 1320.

In operation 1340, the processor 699 may recognize a speech section(s) (e.g., a speech section corresponding to "tomorrow", a speech section corresponding to "in the morning", and a speech section corresponding to "7 o'clock") in a third audio signal using the feature information of the second audio signal. For example, the processor 699 may convert the third audio signal from a time-domain audio frame into a frequency-domain audio frame for each frame. The processor 699 may convert the frequency-domain audio frame into a mel-scaled audio frame using a filter (e.g., a mel filter bank). The processor 699 may enter the audio frame "F3_$i$" of the third audio signal into a CNN model as an input value and may identify a feature vector "FV3_$i$" indicating a feature of F3_$i$ from a result value output from the CNN model. F3_$i$ may refer, for example, to an ith frame of the third audio signal, and "FV3_$i$" may refer, for example, to a feature vector extracted from F3_$i$. The processor 699 may calculate "AV_i" indicating the similarity of FV3_$i$ to feature vectors of the second audio signal. The processor 699 may combine F3_$i$, FV3_$i$, and AV_i into one data "C_i". The processor 699 may enter noise state information of the second audio signal into an RNN model as an input value, thereby configuring the RNN model to an initial state of being operable to output an output value. The processor 699 may enter C_i into the RNN model as an input value and may identify a predictive value "PV_i" indicating whether a voice exists in F3_i in a result value output from the RNN model. The processor 699 may determine F3_i as a voice frame or a noise frame, based on PV_i. When F3_i is a voice frame, the processor 699 may determine whether F3_i is the starting point of the speech section, the end point of the speech section, or a voice frame within the speech section, based on result values output from the RNN model. For example, when F3_i−1 is determined as a noise frame and F3_i is determined as a voice frame, the processor 699 may recognize F3_i as the starting point of the speech section. When F3_i is determined as a voice frame and F3_i+1 is determined as a noise frame, the processor 699 may recognize F3_i as the end point of the speech section. When all of F3_i−1, F3_i, and F3_i+1 are determined as voice frames, the processor 699 may determine F3_i as a voice frame within the speech section. The processor 699 may determine whether all frames F3_1, F3_2, . . . , F3_I of the third audio signal are voice frames, thereby recognizing a speech section(s) in the third audio signal.

According to various example embodiments, an electronic device (e.g., the electronic device 600 of FIG. 6) may include: a microphone; an audio connector; a wireless communication circuit; a processor operatively connected to the microphone, the audio connector, and the wireless communication circuit; and a memory operatively connected to the processor, wherein the memory may store instructions that, when executed, cause the processor to: receive a first audio signal through the microphone, the audio connector, or the wireless communication circuit, extract audio feature information from the first audio signal, and recognize a speech section in a second audio signal, received after the first audio signal through the microphone, the audio connector, or the wireless communication circuit, using the audio feature information.

The instructions, when executed, may cause the processor to: obtain the audio feature information from a result value output from an artificial intelligence model by entering the first audio signal as an input value into the artificial intelligence model trained using an artificial intelligence algorithm.

The instructions, when executed, may cause the processor to: use a first convolutional neural network (CNN) model and a first recurrent neural network (RNN) model as the artificial intelligence model.

The instructions, when executed, may cause the processor to: obtain feature vectors respectively corresponding to frames of the first audio signal from a result value output from the first CNN model by inputting the first audio signal to the first CNN model by a unit of a designated frame, obtain noise state information indicating a temporal change in noise in an entire section of the first audio signal from a result value output from the first RNN model by inputting the first audio signal to the first RNN model by a unit of the frame, and recognize the speech section in the second audio signal using the feature vectors and the noise state information.

The instructions, when executed, may cause the processor to: obtain an nth feature vector for an nth frame by entering the nth frame of the second audio signal into a second CNN model, calculate an nth attention value indicating similarity of the nth feature vector to the feature vectors of the first audio signal, obtain an nth predictive value indicating whether there is a voice in the nth frame by entering the noise state information, the nth frame, the nth feature vector, and the nth attention value into a second RNN model, and recognize the speech section in the second audio signal from predictive values respectively corresponding to frames of the second audio signal, which are obtained from the second RNN model.

The instructions, when executed, may cause the processor to: recognize an utterance designated to call an artificial intelligence (AI) agent in the first audio signal, and input the first audio signal into the artificial intelligence model upon recognizing the call utterance.

The instructions, when executed, may cause the processor to: recognize a key input designated to call an artificial intelligence (AI) agent from an input device provided in the electronic device, and input the first audio signal received after recognizing the call key input to the artificial intelligence model.

The instructions, when executed, may cause the processor to: extract the audio feature information using an artificial intelligence model trained with training data generated by composing noise data and utterance data of a speaker designated to recognize a voice.

The instructions, when executed, may cause the processor to: convert the first audio signal from a time-domain audio frame into a frequency-domain audio frame by a unit of a designated frame, convert the frequency-domain audio frame into a mel-scaled audio frame using a filter, and extract the audio feature information from the converted mel-scaled audio frames of the first audio signal.

The instructions, when executed, may cause the processor to: extract audio feature information from the second audio signal, and recognize a speech section in a third audio signal received after the second audio signal through the microphone, the audio connector, or the wireless communication circuit, using the audio feature information of the second audio signal.

According to various example embodiments, a method for operating an electronic device (e.g., the electronic device 600 of FIG. 6) may include: receiving a first audio signal through a microphone, an audio connector, or a wireless communication circuit; extracting audio feature information from the first audio signal; and recognizing a speech section in a second audio signal, received after the first audio signal through the microphone, the audio connector, or the wireless communication circuit, using the audio feature information.

The extracting of the audio feature information may include: obtaining the audio feature information from a result value output from an artificial intelligence model by entering the first audio signal as an input value into the artificial intelligence model trained using an artificial intelligence algorithm.

The obtaining of the audio feature information may include: obtaining the audio feature information using a first convolutional neural network (CNN) model and a first recurrent neural network (RNN) model as the artificial intelligence model.

The obtaining of the audio feature information may include: obtaining feature vectors respectively corresponding to frames of the first audio signal from a result value output from the first CNN model by inputting the first audio signal to the first CNN model by a unit of a designated frame; and obtaining noise state information indicating a temporal change in noise in an entire section of the first audio signal from a result value output from the first RNN model by inputting the first audio signal to the first RNN model by a unit of the frame. The recognizing of the speech section may include recognizing the speech section in the second audio signal using the feature vectors and the noise state information.

The recognizing of the speech section may include: obtaining an nth feature vector for an nth frame by entering the nth frame of the second audio signal into a second CNN model; calculating an nth attention value indicating similarity of the nth feature vector to the feature vectors of the first audio signal, obtaining an nth predictive value indicating whether there is a voice in the nth frame by entering the noise state information, the nth frame, the nth feature vector, and the nth attention value into a second RNN model; and recognizing the speech section in the second audio signal from predictive values respectively corresponding to frames of the second audio signal, which are obtained from the second RNN model.

The obtaining of the audio feature information may include: recognizing an utterance designated to call an artificial intelligence (AI) agent in the first audio signal; and inputting the first audio signal into the artificial intelligence model upon recognizing the call utterance.

The obtaining of the audio feature information may include: recognizing a key input designated to call an artificial intelligence (AI) agent from an input device provided in the electronic device; and inputting the first audio signal received after recognizing the call key input to the artificial intelligence model.

The extracting of the audio feature information may include extracting the audio feature information using an artificial intelligence model trained with training data generated by composing noise data and utterance data of a speaker designated to recognize a voice.

The extracting of the audio feature information may include: converting the first audio signal from a time-domain audio frame into a frequency-domain audio frame by a unit of a designated frame: converting the frequency-domain audio frame into a mel-scaled audio frame using a filter: and extracting the audio feature information from the converted mel-scaled audio frames of the first audio signal.

The method may further include: extracting audio feature information from the second audio signal; and recognizing a speech section in a third audio signal received after the second audio signal through the microphone, the audio connector, or the wireless communication circuit, using the audio feature information of the second audio signal.

Embodiments of the disclosure disclosed in the specification and drawings merely provide various examples to easily describe the technical details according to various embodiments of the disclosure and to aid in understanding of the disclosure and are not intended to limit the scope of the disclosure. Therefore, the scope of the disclosure should be understood to include all changes or modifications derived based on the technical idea of the disclosure in addition to the embodiments disclosed herein. It will also be understood that any of the embodiment(s) described herein may be used in conjunction with any other embodiment(s) described herein.

What is claimed is:

1. An electronic device comprising:
   a microphone;
   an audio connector;
   a wireless communication circuit;
   at least one processor; and
   memory storing instructions that, when executed by the at least one processor, cause the electronic device to:
   receive a first audio signal through the microphone, the audio connector, or the wireless communication circuit;
   obtain feature vectors respectively corresponding to frames of the first audio signal from a result value output from a first artificial intelligence (AI) model by inputting the first audio signal to the first AI model;
   obtain noise state information corresponding to noise in a section of the first audio signal from a result value output from a second AI model by inputting the first audio signal to the second AI model; and
   recognize a speech section in a second audio signal, received after the first audio signal through the microphone, the audio connector, or the wireless communication circuit, using audio feature information including the feature vectors and the noise state information.

2. The electronic device of claim 1, wherein the first AI model comprises a first convolutional neural network (CNN) model, and wherein the second AI model comprises a first recurrent neural network (RNN) model.

3. The electronic device of claim 1, wherein the instructions, when executed by the at least one processor, cause the electronic device to:
   obtain an nth feature vector for an nth frame by entering the nth frame of the second audio signal into a second CNN model;
   calculate an nth attention value indicating similarity of the nth feature vector to the feature vectors of the first audio signal;
   obtain an nth predictive value indicating whether there is a voice in the nth frame by entering the noise state information, the nth frame, the nth feature vector, and the nth attention value into a second RNN model; and
   recognize the speech section in the second audio signal from predictive values respectively corresponding to frames of the second audio signal, which are obtained from the second RNN model.

4. The electronic device of claim 1, wherein the instructions, when executed by the at least one processor, cause the electronic device to:
   recognize an utterance designated to call an artificial intelligence (AI) agent in the first audio signal; and
   based on the recognizing of the call utterance, input the first audio signal into the first AI model and the second AI model.

5. The electronic device of claim 1, wherein the instructions, when executed by the at least one processor, cause the electronic device to:
   recognize a key input designated to call an artificial intelligence (AI) agent from an input device provided in the electronic device; and
   input the first audio signal received after recognizing the call key input to the first AI model and the second AI model.

6. The electronic device of claim 1, wherein the first AI model and the second AI model are trained with training data generated by noise data and utterance data of a speaker designated to recognize a voice.

7. The electronic device of claim 1, wherein the instructions, when executed by the at least one processor, cause the electronic device to:
   convert the first audio signal from a time-domain audio frame into a frequency-domain audio frame by a unit of a designated frame:
   convert the frequency-domain audio frame into a mel-scaled audio frame using a filter; and input the converted mel-scaled audio frames of the first audio signal into the first AI model and the second AI model.

8. The electronic device of claim 1, wherein the instructions, when executed by the at least one processor, cause the electronic device to:
extract audio feature information from the second audio signal; and
recognize a speech section in a third audio signal received after the second audio signal through the microphone, the audio connector, or the wireless communication circuit, using the audio feature information of the second audio signal.

9. A method for operating an electronic device, the method comprising:
receiving a first audio signal through a microphone, an audio connector, or a wireless communication circuit;
obtaining feature vectors respectively corresponding to frames of the first audio signal from a result value output from a first artificial intelligence (AI) model by inputting the first audio signal to the first AI model;
obtaining noise state information corresponding to noise in a section of the first audio signal from a result value output from a second AI model by inputting the first audio signal to the second AI model; and
recognizing a speech section in a second audio signal, received after the first audio signal through the microphone, the audio connector, or the wireless communication circuit, using audio feature information including the feature vectors and the noise state information.

10. The method of claim 9,
wherein the first AI model comprises a first convolutional neural network (CNN) model, and
wherein the second AI model comprises a first recurrent neural network (RNN) model.

11. The method of claim 9, wherein the recognizing of the speech section comprises:
obtaining an nth feature vector for an nth frame by entering the nth frame of the second audio signal into a second CNN model;
calculating an nth attention value indicating similarity of the nth feature vector to the feature vectors of the first audio signal;
obtaining an nth predictive value indicating whether there is a voice in the nth frame by entering the noise state information, the nth frame, the nth feature vector, and the nth attention value into a second RNN model; and
recognizing the speech section in the second audio signal from predictive values respectively corresponding to frames of the second audio signal, which are obtained from the second RNN model.

12. The method of claim 9, wherein the obtaining of the feature vectors and the noise state information comprises:
recognizing an utterance designated to call an artificial intelligence (AI) agent in the first audio signal; and
based on the recognizing of the call utterance, inputting the first audio signal into the first AI model and the second AI model.

13. The method of claim 9, wherein the obtaining of the feature vectors and the noise state information comprises:
recognizing a key input designated to call an artificial intelligence (AI) agent from an input device provided in the electronic device; and
inputting the first audio signal received after recognizing the call key input to the first AI model and the second AI model.

14. The method of claim 9, wherein the first AI model and the second AI model are trained with training data generated by noise data and utterance data of a speaker designated to recognize a voice.

15. The method of claim 9, further comprising:
converting the first audio signal from a time-domain audio frame into a frequency-domain audio frame by a unit of a designated frame; and
converting the frequency-domain audio frame into a mel-scaled audio frame using a filter, and
wherein the obtaining of the feature vectors and the noise state information comprises:
inputting the converted mel-scaled audio frames of the first audio signal into the first AI model and the second AI model.

16. The method of claim 9, further comprising:
extracting audio feature information from the second audio signal; and
recognizing a speech section in a third audio signal received after the second audio signal through the microphone, the audio connector, or the wireless communication circuit, using the audio feature information of the second audio signal.

* * * * *